United States Patent [19]
Nahill et al.

[11] Patent Number: 6,063,325
[45] Date of Patent: May 16, 2000

[54] METHOD FOR PREVENTING UNCONTROLLED POLYMER FLOW IN PREFORM NECK FINISH DURING PACKING AND COOLING STAGE

[75] Inventors: Thomas E. Nahill, Amherst; Suppayan M. Krishnakumar, Nashua; Wayne N. Collette, Merrimack, all of N.H.

[73] Assignee: Continental PET Technologies, Inc., Florence, Ky.

[21] Appl. No.: 08/702,755

[22] Filed: Aug. 22, 1996

[51] Int. Cl.[7] .................................................. B29C 45/16
[52] U.S. Cl. ................ 264/513; 264/328.8; 264/328.12; 425/130
[58] Field of Search ..................... 264/255, 513, 264/328.8, 328.12, 45.1; 425/130

[56] References Cited

U.S. PATENT DOCUMENTS

| | | | |
|---|---|---|---|
| 4,332,545 | 6/1982 | Cargile | 425/577 |
| 4,550,043 | 10/1985 | Beck | 428/36 |
| 4,554,190 | 11/1985 | McHenry | 428/35 |
| 4,609,516 | 9/1986 | Krishnakumar et al. | 264/255 |
| 4,627,952 | 12/1986 | Ophir | 264/328 |
| 4,781,954 | 11/1988 | Krishnakumar et al. | 428/35 |
| 4,847,129 | 7/1989 | Collette et al. | 264/255 |
| 5,539,675 | 7/1996 | Carroll, Sr. et al. | 364/560 |
| 5,676,267 | 10/1997 | Slat et al. | 264/513 |

FOREIGN PATENT DOCUMENTS

| | | |
|---|---|---|
| 0 153 120 A2 | 8/1985 | European Pat. Off. . |
| 0 392 571 A2 | 10/1990 | European Pat. Off. . |
| 0 596 872 A2 | 5/1994 | European Pat. Off. . |

*Primary Examiner*—Jill L. Heitbrink
*Attorney, Agent, or Firm*—Wolf, Greenfield & Sacks, P.C.

[57] ABSTRACT

A method of reducing uncontrolled flow of a molten polymer during the packing and cooling stage of an injection molding cycle. A plurality of polymers are injected between a mold cavity and core for making a multilayer plastic article such as a preform, having an exterior layer of a first polymer and an interior layer of a second polymer. In a tapered region of the mold, a minimum width of the tapered region is selected to prevent the second polymer from developing an enhanced leading/trailing edge effect which causes the second polymer to reverse flow during the packing and cooling stage. The method is particularly useful for making preforms for blow molded containers, such as a ketchup container, having a relatively long and thin neck profile. In addition, the method maintains the interior (barrier) layer a minimum distance from the top sealing surface of the preform, in order to prevent defective heat-bonded seals.

14 Claims, 18 Drawing Sheets

METHOD FOR PREVENTING UNCONTROLLED POLYMER FLOW IN PREFORM NECK FINISH DURING PACKING AND COOLING STAGE

FIELD OF THE INVENTION

The present invention relates to a method for avoiding structural defects in injection-molded articles, such as preforms, caused by uncontrolled backflow and/or top sealing surface erosion which occur during the packing and cooling stage of the injection cycle.

BACKGROUND OF THE INVENTION

Continental PET Technologies, Inc. (CPT) developed and commercialized a sequential injection process for making multilayer plastic containers (see U.S. Pat. Nos. 4,550,043, 4,609,516 and 4,781,954). These containers are currently in use as hot-fill juice and ketchup containers. The CPT process enables the use of thin layers of expensive barrier materials (for oxygen sensitive products), external layers of thermal-resistant materials (for high temperature filling and/or caustic wash refill applications), and/or interior layers of recycled materials (e.g., core layers not in contact with the food product).

U.S. Pat. No. 4,781,954 describes CPT's sequential injection process for making a five-layer container having inner and outer layers of polyethylene terephthalate (PET), a central core layer of PET, and first and second intermediate layers of a barrier polymer. The intermediate layers can be made very thin, e.g., 0.01–0.15 mm, based upon the relative melting points of the different polymers and the layer solidification/tunnel flow characteristic of the sequential process—wherein later-injected molten polymers push prior-injected molten polymers between outer layers which have solidified on the cold mold cavity and core walls. More specifically, a first metered shot of PET is injected into the end cap (via the injection gate or sprue) of the preform mold and flows about halfway up the sidewall where it momentarily slows or stops, before a second injection is made. Inner and outer solidified layers of PET are formed along the cold mold cavity and core walls, while the interior PET remains warm and fluid. Then, a second metered shot of a barrier polymer is made through the gate, which forms a melt pool at the bottom of the preform. The flow resistance provided by the first shot (PET) in the sequential injection process has a self-leveling effect on the second shot, causing the second shot (barrier) to form a melt pool that is substantially evenly distributed at all points (360°) around the circumference at the cavity end cap. Finally, a third metered shot of PET is made which pushes the barrier melt pool up the sidewall to form two thin intermediate layers adjacent the solidified inner and outer PET layers, with the molten PET core layer (third shot) there between. The barrier material (e.g., EVOH) normally has a lower melting temperature than the first-injected (PET) material, and therefore the cooling effect of the solidified first layers on the barrier material is not as great as the cooling effect of the mold surfaces on the first (PET) material. Thus, while there will be some solidification of the barrier material as it contacts the inner and outer solidified PET layers, the third injected (PET) material will remelt some of the solidified barrier material and advance it together with the remaining barrier melt material up through the center of the preform (tunnel flow), thereby further reducing the thickness of the intermediate barrier layers.

The result is a relatively simple and highly-reproducible process with a number of important benefits. For example, the five-layer PET/EVOH ketchup bottles made by this process have largely replaced the prior commercial polypropylene/EVOH/adhesive bottles, for at least three reasons. First, the five-layer PET/EVOH container is transparent. PET provides a sparkling clear container which is aesthetically superior to the prior translucent polypropylene container. Second, the EVOH layers in the PET container constitute only 1.5 percent of the bottle's weight and do not require adhesive layers to adhere the EVOH to the PET. Rather, the CPT process maintains the PET/EVOH layer relationship during manufacture and use, but allows the layers to separate readily when the bottle is reground for recycling; the two polymers are then separated by conventional gravimetric and other means and the PET reprocessed as part of the PET soda bottle recycling stream. In contrast, the prior polypropylene bottle utilizes about 6 to 10 percent EVOH barrier and olefinic adhesive layers which, not only are more expensive, but also prevent post-use segregation of the constituent polymers. As a result, most of these bottles end up in municipal waste dumps. A third important commercial benefit is that the PET/EVOH container (unlike the polypropylene version) is substantially shatterproof when dropped onto a hard surface. For at least the above reasons, the CPT container has been a significant commercial success and recognized by the industry with various design awards.

One problem that has vexed multilayer plastic container manufacturers, using both sequential and simultaneous injection processes, is an uncontrolled natural flow phenomena known as "backflow" which occurs in the terminal end of an injection-molded article during the packing and cooling stage of the injection cycle. This is described in U.S. Pat. No. 4,627,952 to Ophir, col. 1, lines 17–31, as an interruption in the laminar flow of the polymer in the mold cavity when it strikes the terminal end of the cavity and reverses its flow direction upon packing. As described by Ophir, in a conventional injection molding process one first injects polymer melt into a closed mold and, subsequently, packs additional melt into the cavity to compensate for the densification (shrinkage) of the melt during the cooling stage. In the terminal or "dead-end" zone of the mold cavity where the melt layers begin to pack, the polymer flow strikes the terminal wall and reverses its flow direction to produce "rebound wave patterns" on a molecular scale in the melt; these wave patterns are points of structural weakness because the multiple layers (waves) are liable to separate. Ophir's proposed solution is to open up the previous dead-end of the mold by providing an outlet, which allows the molten polymer to continuously exit through the terminal end of the mold.

Ophir's proposed solution of opening up the terminal end of the mold may be acceptable in certain applications, but it obviously increases the complexity of the mold apparatus and introduces new variables in the process, including the need to trim and remove "excess" terminal end material. Tighter controls over the temperature, pressure, viscosity, etc., may be another possible way to eliminate backflow; however, such controls reduce the "processing window" available to the container manufacturer and thus inherently increase the manufacturing cost and/or number of defective containers. This is particularly true with today's large-scale multicavity injection molding systems, having a high throughput. Thus, there is need for a better understanding of the undesirable and substantially uncontrollable backflow phenomena which occurs during packing, and a method to avoid the same.

Another serious problem experienced by many multilayer container manufacturers is the inability to provide an effective foil seal at the top sealing surface of the container. For example, heat-bonded foil seals are used on commercial ketchup containers to seal out oxygen. Any deficiency in the seal between the top end of the container and the foil liner leads to exposure of the product to oxygen, with resulting degradation and/or leakage. Again, the causes and ability to control the defective seal are not yet well understood.

SUMMARY OF THE INVENTION

In accordance with the present invention, injection molding methods, articles and molds are provided which reduce or eliminate the problems of backflow and sealing defects brought on during the packing and cooling stage of the injection molding cycle. Both the source of these problems, and methods of preventing the same, have been discovered.

It has been determined that tapered (i.e., restricted) regions in the injection mold have caused minor leading edge effects at the polymer flow fronts to increase unacceptably. A minor leading edge effect may be caused, for example, by a slight misalignment between the core and outer cavity of the mold, or by slight temperature differences around the circumference of the mold. When these minor leading edge effects are enhanced by traversal through a restricted region, it may lead to unavoidable backflow during the subsequent packing stage of the injection molding process.

In consequence, a method of injection molding a multilayer article is provided wherein a first flow front of a first material precedes a second flow front of a second material in the mold. If the first flow front develops a leading edge effect, a tapered region in the mold may cause a circumferential flow of material at the first flow front; this will reduce the leading edge effect in the first flow front, but unfortunately leads to development/enhancement of a more significant leading edge effect in the second (or subsequent) flow front. It has been found that this circumferential flow of the first material may be reduced by increasing the minimum width of any tapered region or construction in the mold. Note that as used herein "first" and "second" are relative to the sequence of injections into the mold and are not meant to exclude prior, subsequent or intermediate injections of other materials.

By way of example, a multilayer preform has (from top to bottom) a neck finish, a tapered neck region, a sidewall and a base. The wall thickness of the tapered neck region is selected such that an interior barrier layer (second material) extends substantially up to the neck finish at all points around the circumference and the second material does not exhibit a flow reversal during the packing and cooling stage. This is particularly useful in making preforms for stretch blow-molded containers having a relatively long and thin (narrow) neck profile, such as ketchup containers. The tapered neck region of the preform may be adapted to be radially stretched on the order of 1 to 2 times, and axially stretched on the order of 2 to 3 times in order to provide the desired biaxial orientation for strength; note that the radial stretch is low due to the long and thin neck profile of the container.

In a preferred embodiment, a minimum wall thickness of the tapered neck region of the preform is at least on the order of 2 mm or greater.

In addition, there are certain weight ratios for which the present invention is particularly advantageous. More specifically, the tapered neck region, sidewall and base together comprise a body portion having a body weight; the remaining neck finish has a finish weight. For a ratio of finish to body weight of 1:4, there is generally no problem with backflow (the reason being the relatively large finish). A ratio of 1:6 is a transition region for which backflow may or may not be a problem; above this ratio there is likely to be a backflow problem. A ratio of 1:8 may produce backflow most of the time.

Still further, for a neck finish of a given finish height and a body of a given body height, the present invention is useful where a minimum ratio of the finish height to body height is 0.2:1; i.e., a small finish height is more likely to have a backflow problem.

It has further been found that excessive backflow during the packing stage may cause an erosion of the first (outer) material layer at the top sealing surface of the finish, such that the second (interior) material layer gets too close to, or breaks through, the top sealing surface, either of which may lead to a defective seal. To avoid this problem, backflow should be minimized and preferably, backflow of the interior layer should not be allowed to continue such that the capping ring (flange), at the lower end of the neck finish, exhibits backflow around the full circumference of the ring.

These and other features of the present invention will be more particularly understood from the following detailed description and drawings.

DETAILED DESCRIPTION OF THE DRAWINGS

FIGS. 2A–7A and 2B–7B are similar to FIGS. 1A and 1B respectively, but are each taken at a successively later time in the injection cycle and show the development of backflow during the cooling and packing stage;

FIGS. 15A–17A, 15B–17B and 15C–17C are similar to FIGS. 14A, 14B and 14C respectively but show additional amounts of backflow in the neck finish and flange;

DETAILED DESCRIPTION

In an attempt to better understand the backflow problem, a series of short shots were performed to illustrate what happens during the end of the filling stage, and during the packing and cooling stage. These short shots are illustrated in FIGS. 1–7, and include a series of preform neck finish cross sections and related pressure versus time graphs. Each of FIGS. 1B–7B shows the same pressure/time cycle, with a movable arrow indicating the time in the cycle at which the preform cross section (shown above in FIGS. 1A–7A) was evaluated.

The pressure/time curve of FIGS. 1–7 is typical for CPT's sequential injection molding process for making a five-layer PET/EVOH container wherein: a first shot of virgin PET forms exterior inner and outer layers of the preform; a second shot of EVOH forms first and second intermediate barrier layers adjacent the inner and outer layers; and a third shot of virgin or recycled PET forms a central core layer between the intermediate layers. The mold filling portion of the cycle takes about 5.5 seconds and includes: a first shot of virgin PET beginning at t=0 second; a second shot of EVOH beginning at t=2.1 seconds; and a third shot of virgin or recycled PET beginning at t=2.4 seconds. There are two slight pressure drops shown in FIG. 1B, which indicate the termination of the first shot and onset of the second and third shots, respectively. The cavity pressure increases rapidly during the initial portion of the first shot and then levels off at about 4000 psi for the remainder of the 5.5 second filling time. Next, during the packing and cooling stage, the pressure is rapidly increased to about 12,000 psi and held there for about 2 seconds; this insures a complete filling of the mold; then, at t=7.5 seconds, the pressure is rapidly dropped to about 7000 psi and held for about 7 seconds. The holding pressure is maintained to avoid the formation of depressions or sink marks in the final molded article. Finally, at about t=15 seconds, the pressure is released and drops to zero.

Figure 1A:
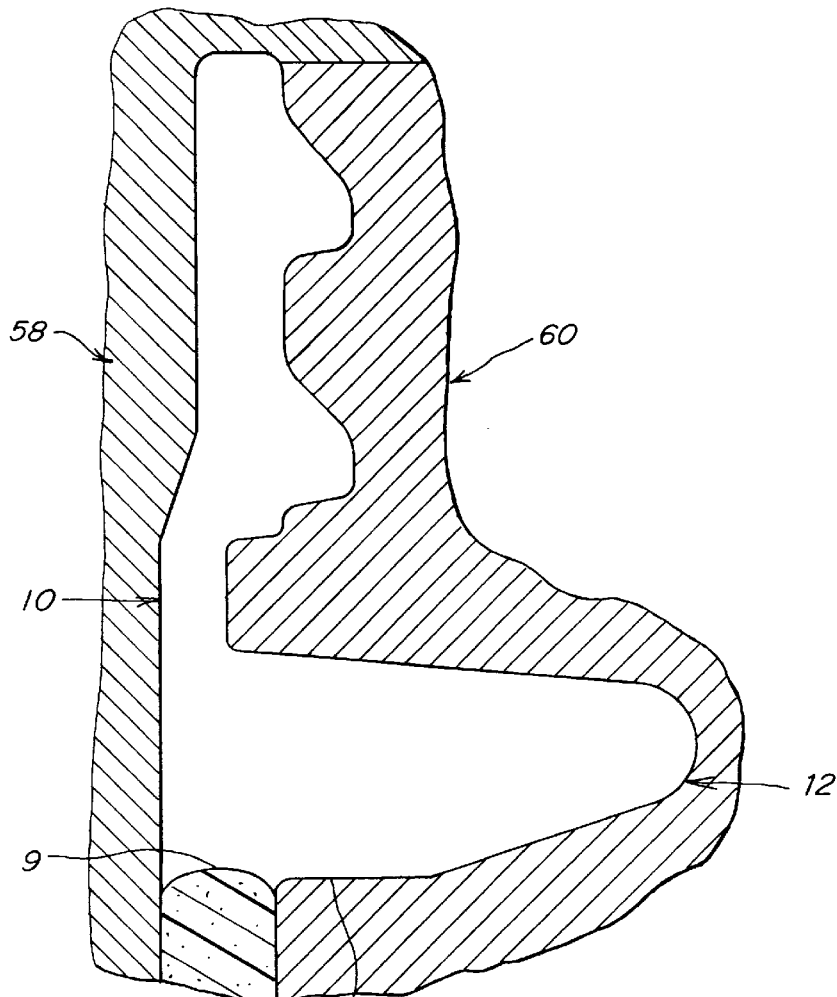
FIG. 1A is a schematic illustration of melt flow in a preform neck finish during an injection molding cycle.
Figure 1B:
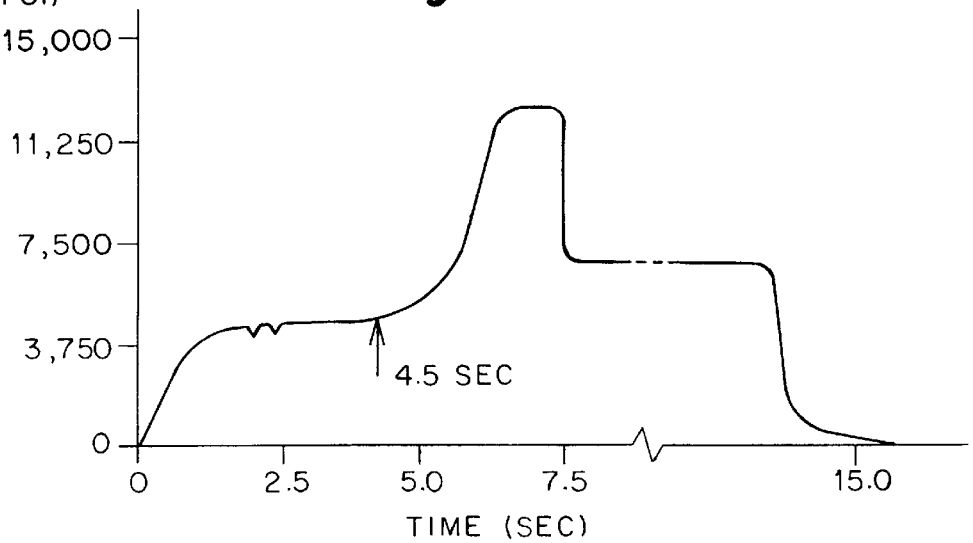
FIG. 1B is a pressure versus time graph for the injection cycle.

FIGS. 1A–1B illustrate a point near the end of the filling stage (at t=4.5 seconds), wherein a first flow front 9 of the first shot (virgin PET) is seen approaching a bottom surface 11 of a support ring (flange) 12 of a neck finish 10. The second and third shots are substantially below this point and not visible in FIG. 1A.

Figure 2A:
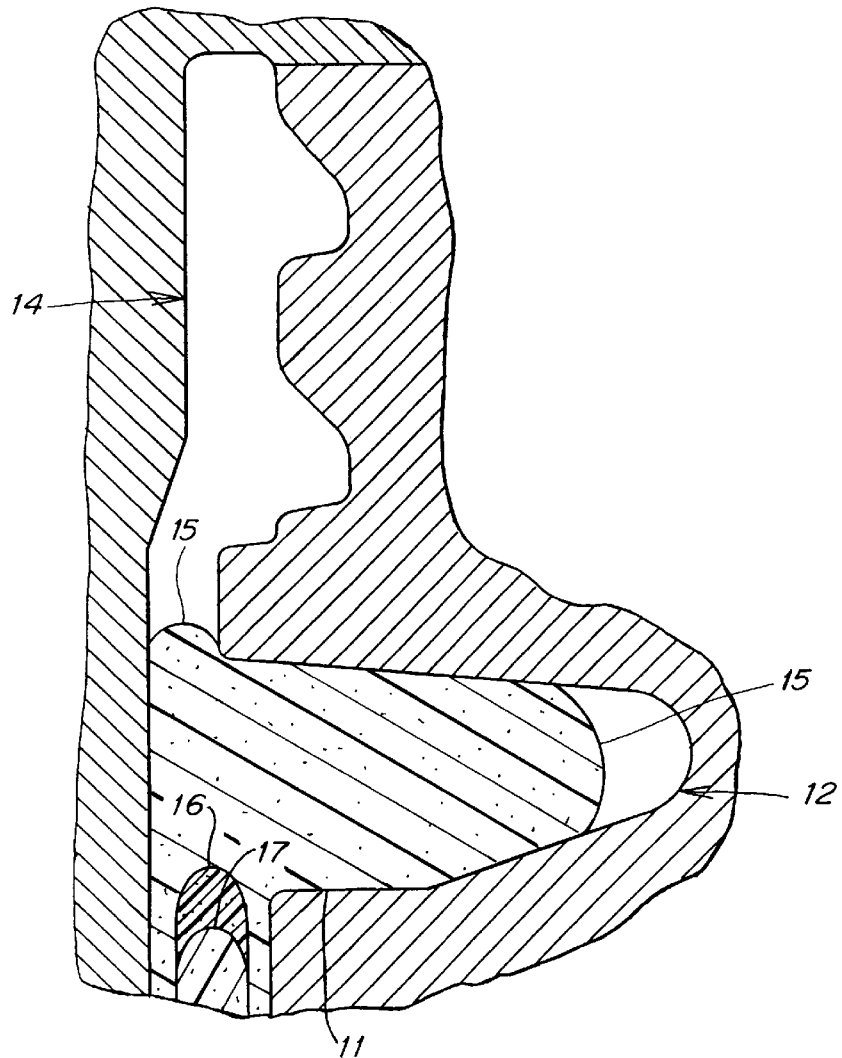
Figure 2B:
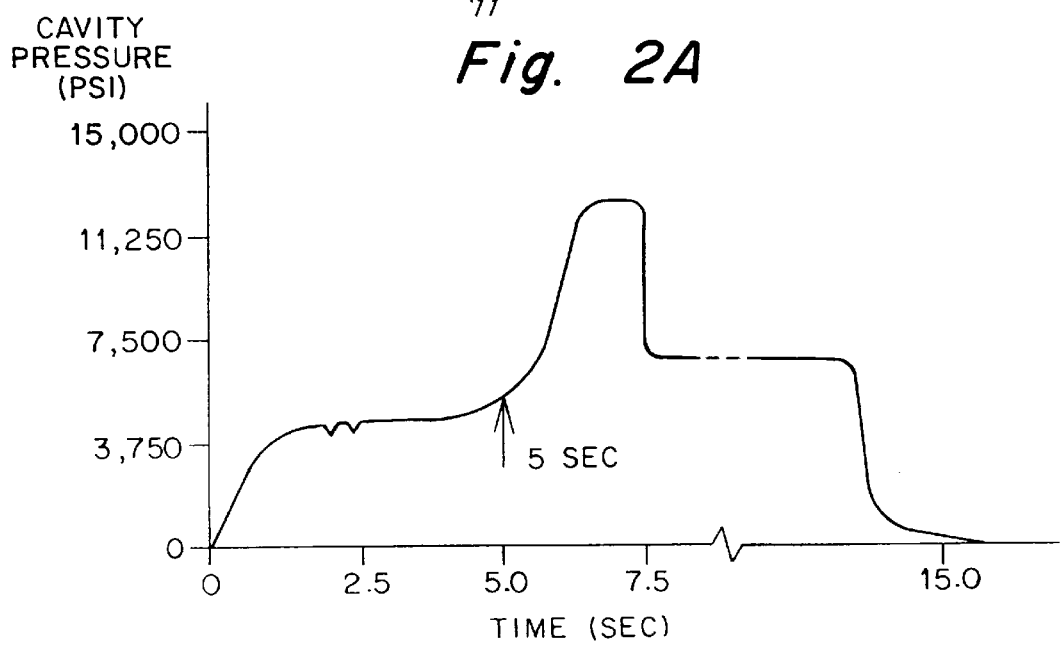

Next, FIGS. 2A–2B, which are taken even closer to the end of the filling stage (at t=5 seconds), show that a first flow front 15 (virgin PET) has expanded to fill most of the flange 12 and is continuing up into an upper portion 14 of the neck finish (above flange 12). A second flow front 16 (EVOH) is just reaching the lowermost end 11 of the flange, followed by a third flow front 17 (of virgin or recycled PET).

Figure 3A:
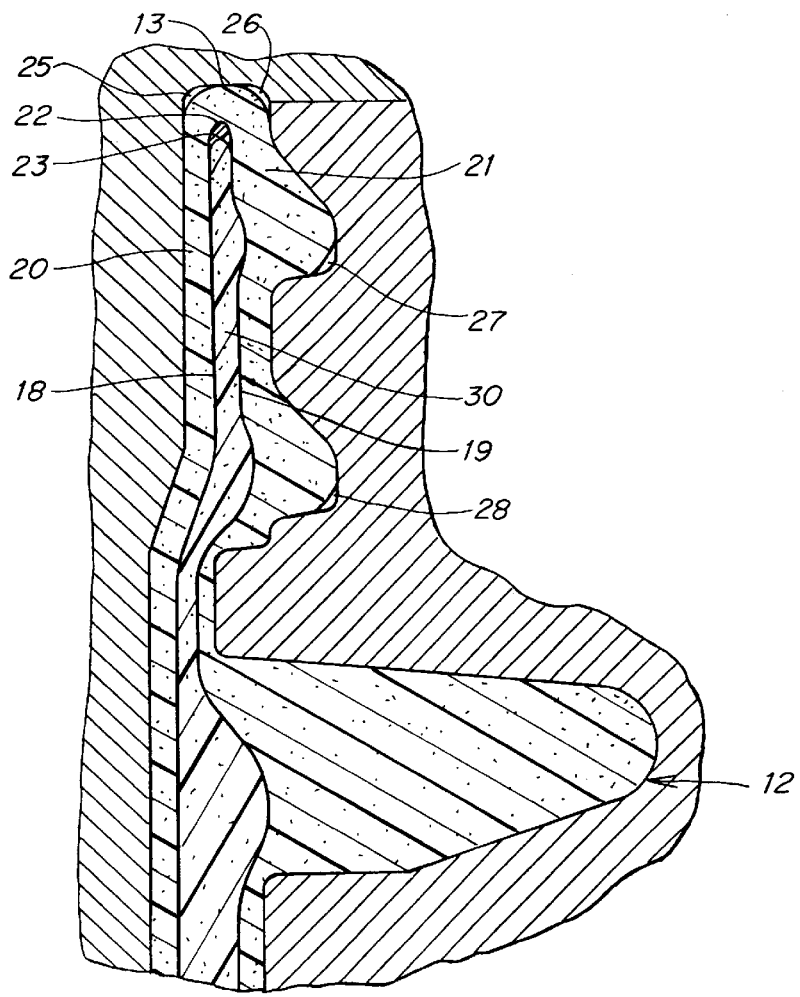
Figure 3B:
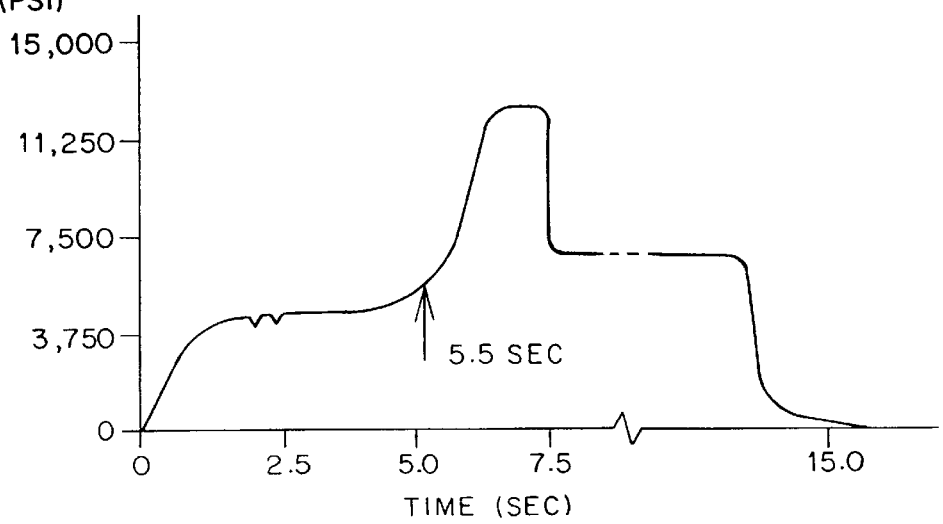

In FIGS. 3A–3B, taken at the end of the filling stage (t=5.5 seconds), the first shot (PET) has formed inner and outer layers (20, 21) throughout substantially all of the neck finish, and filled the flange 12. A second flow front 22 (EVOH) is nearing a top sealing surface 13 of the preform, but has not broken through the first shot. A third flow front 23 (PET) is close behind the second shot. There are some corners 25–28 of the neck finish which have not yet been filled. It should be understood in FIGS. 2–8 that lines 18,19 represent the inner intermediate and outer intermediate second shot (EVOH) material layers in the preform, respectively, which surround a central core layer 30 of the third shot (PET) material.

Figure 4A:
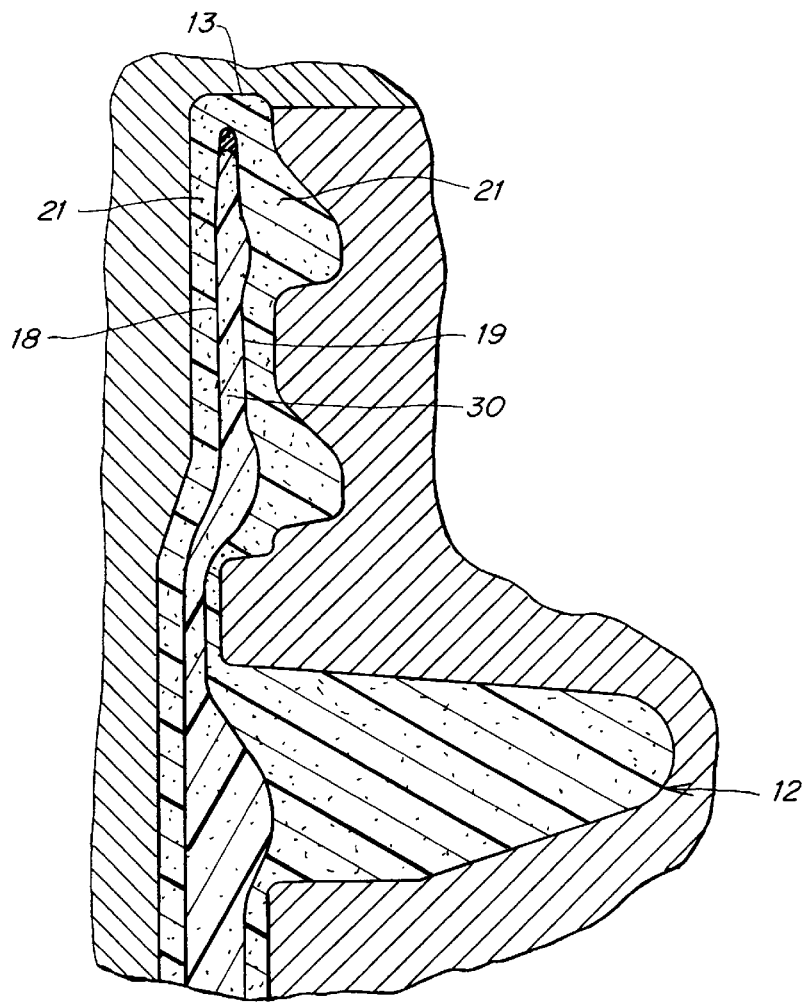
Figure 4B:
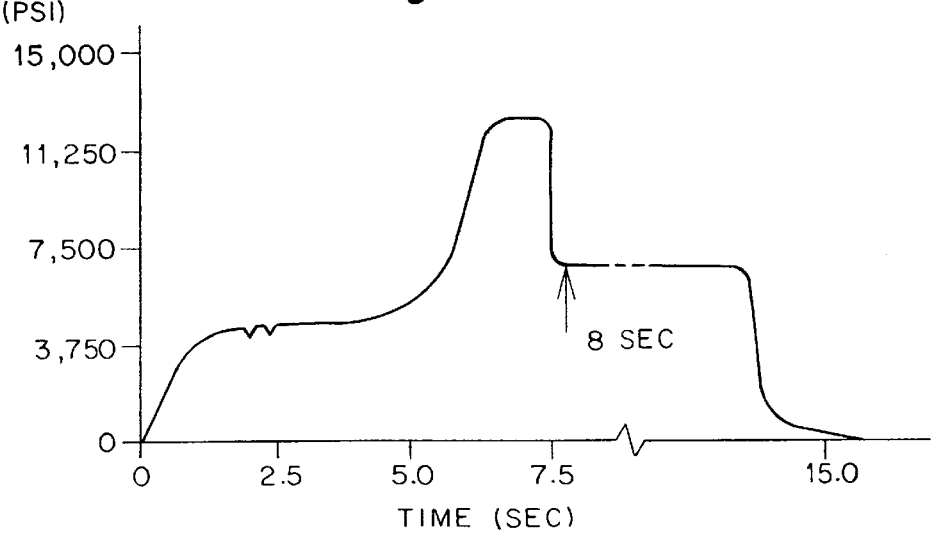

FIGS. 4A–4B show the neck finish right after the packing (boost) stage, at t=8 seconds. Here, the first shot has completely filled all areas of contact with the core and cavity walls, and the second and third shots (layers 18, 19, 30) extend substantially vertically throughout the neck finish without penetrating the top sealing surface 13.

Figure 8A:
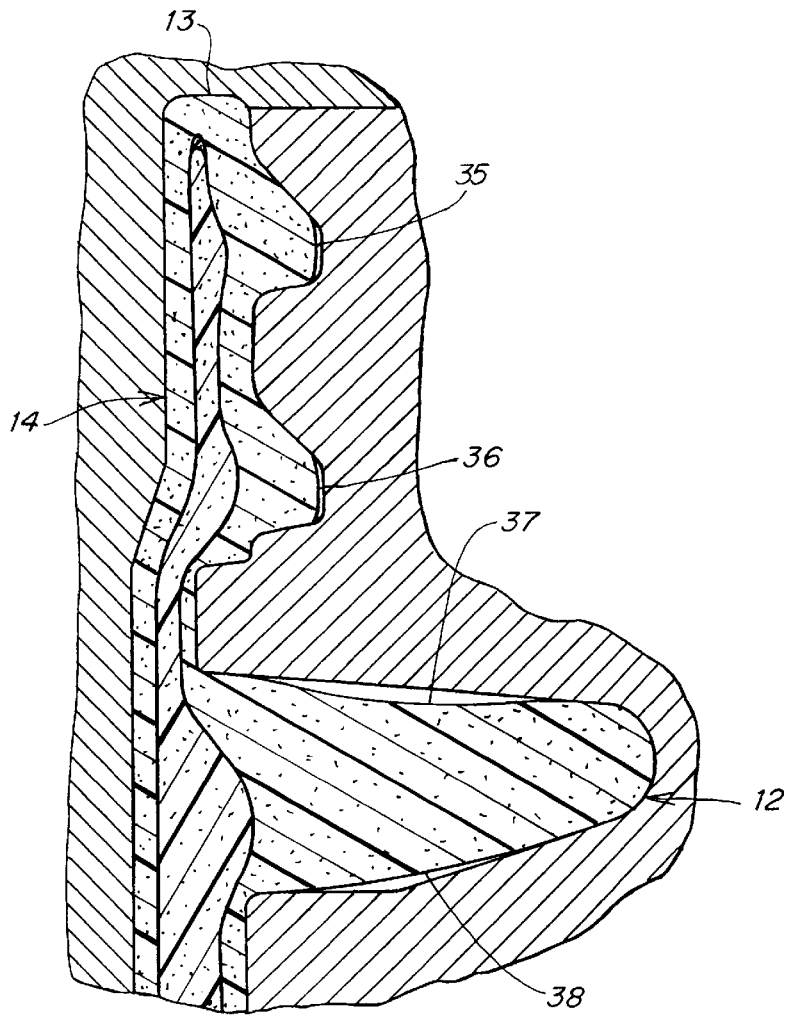
FIGS. 8A and 8B are similar to FIGS. 1A and 1B respectively, but for a different injection cycle without an extended hold step, and wherein a molded article with sink marks is shown after the cycle is completed.
Figure 8B:
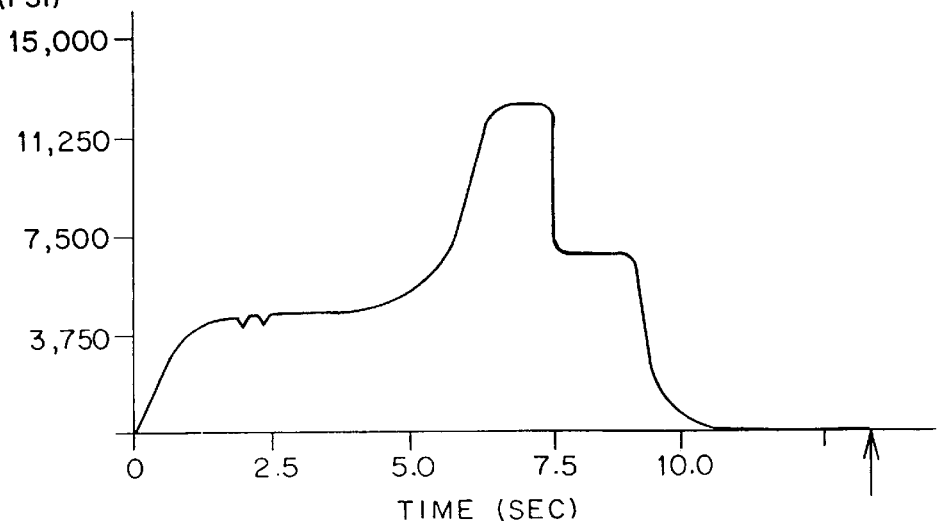

If we now modified the cycle (see FIG. 8B) to eliminate much of the subsequent extended holding step (after t=8 seconds), then as shown in FIG. 8A there would form in the neck finish depressions or sink marks 35–38 where the outer layer has shrunk away from the cavity wall. This is particularly noticeable in the upper and lower flange surfaces at 37 and 38, because the flange 12 is a relatively thick-walled portion of the neck finish (as compared to upper portion 14). These sink marks are undesirable because they reduce the tightness of the fit between the threads on the neck finish and the cap; also, sinks in the body wall of the preform may adversely influence the reheat and stretch blow characteristics of the preform. Thus, a holding step is necessary.

Figure 5A:
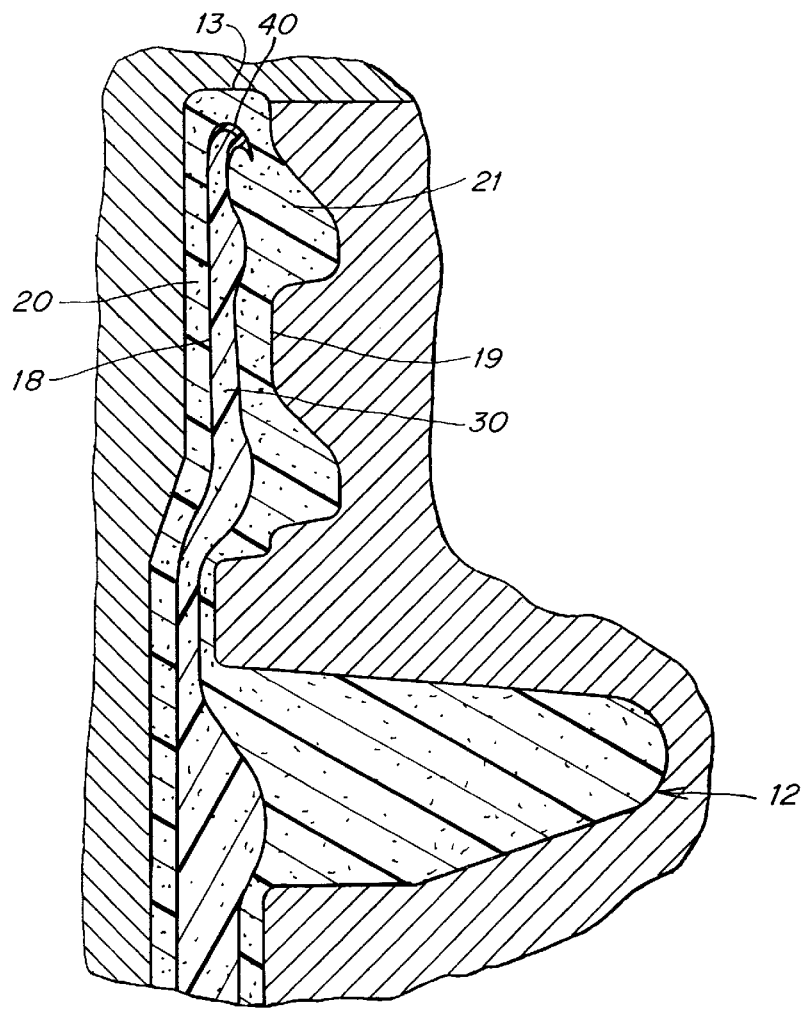
Figure 5B:
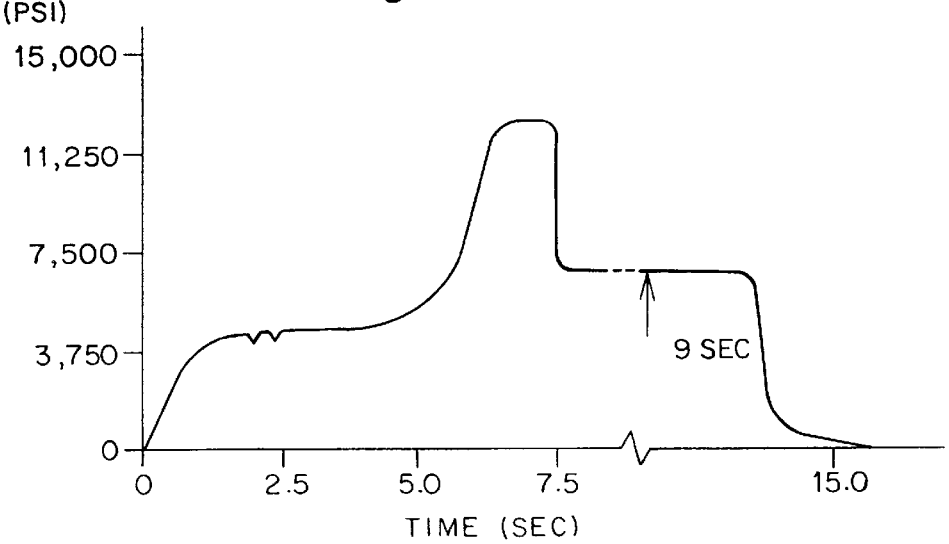

Returning to our prior sequence, FIGS. 5A–5B show a point early in the holding step (at t=9 seconds) where undesired backflow begins to develop. The holding pressure is intended to maintain the preform in contact with the cold mold cavity and core walls, and therefore the inner and outer preform layers (20, 21) are cooler than the interior second (18, 19) and third (30) shot layers. If the second and third shots are still molten, they seek a flow path of least resistance which in this case is back down towards the flange 12 (where the greatest amount of contraction is occurring in the outer layer). As a result, a spill over or fingering portion 40 forms at the terminal end including both of the second and third shot layers; the fingering portion, which is the initiation of backflow, is directed radially outwardly and back down towards the flange.

Figure 6A:
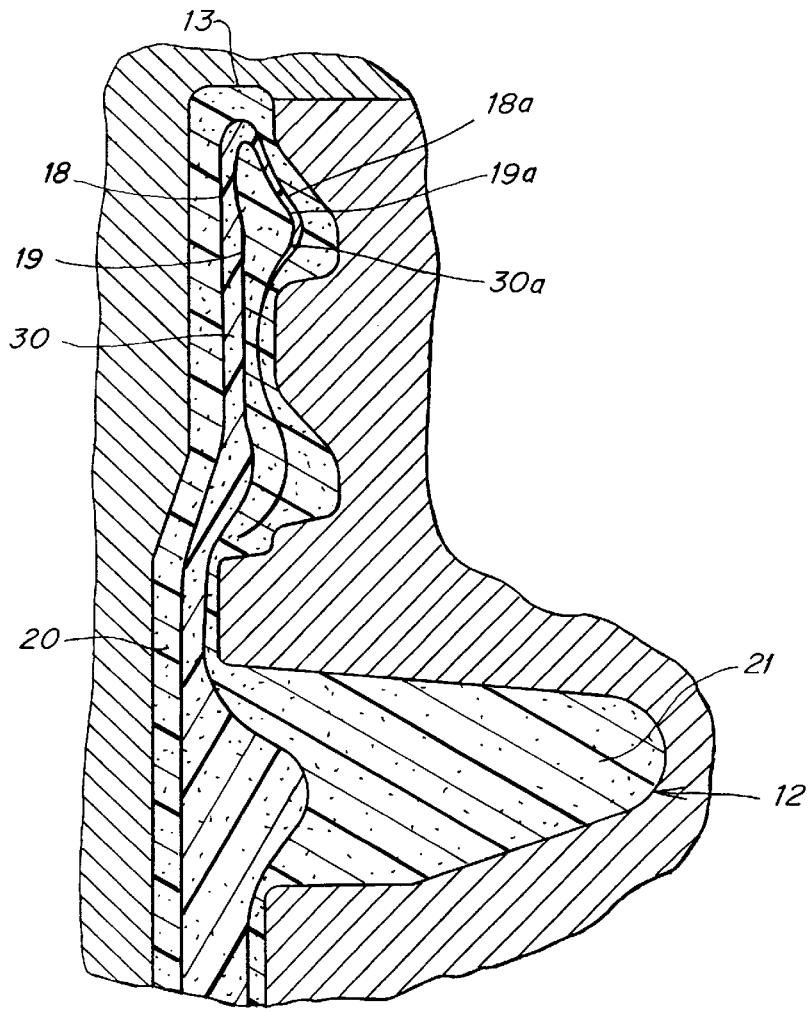
Figure 6B:
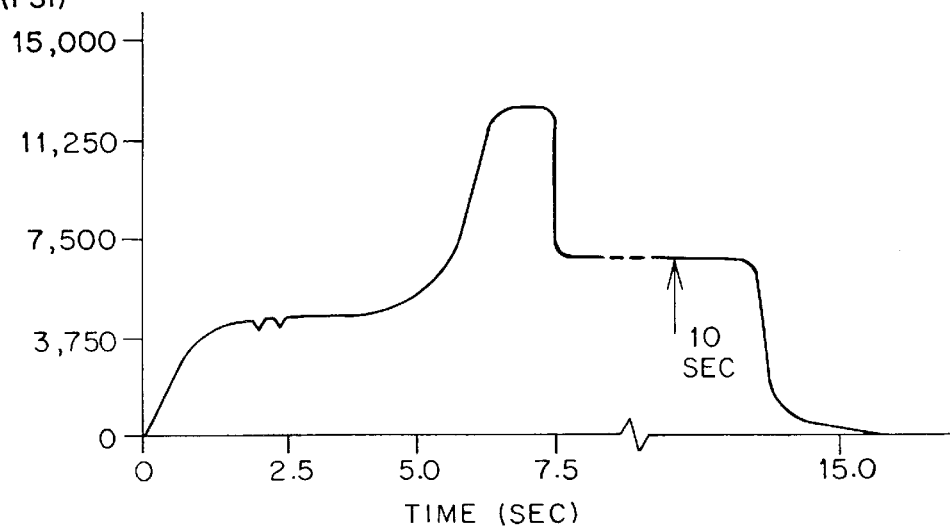

As shown in FIGS. 6A–6B (at t=10 seconds), the second and third shot layers have now traveled back down (backflowed) a substantial portion of the neck finish toward the flange 12, to form backflow layers 18a, 30a and 19a (of barrier, PET, barrier, respectively). These excess layers in the neck flange, caused by backflow, reduce the mechanical strength of the neck finish and are thus undesirable.

Figure 7A:
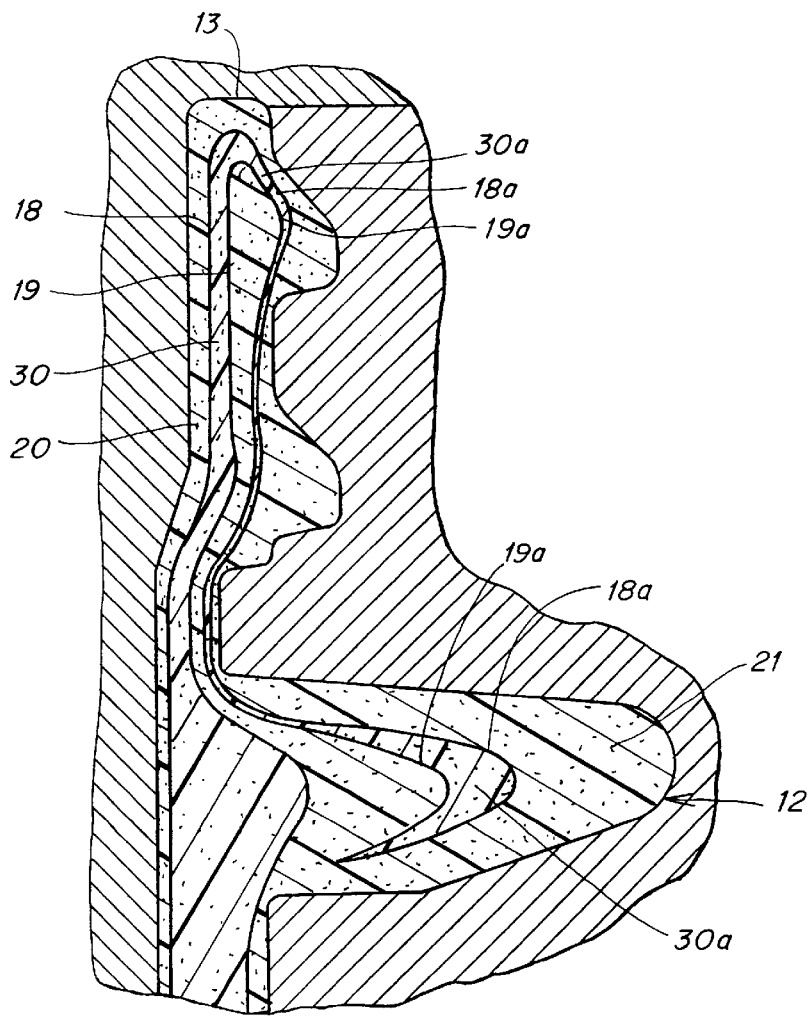
Figure 7B:
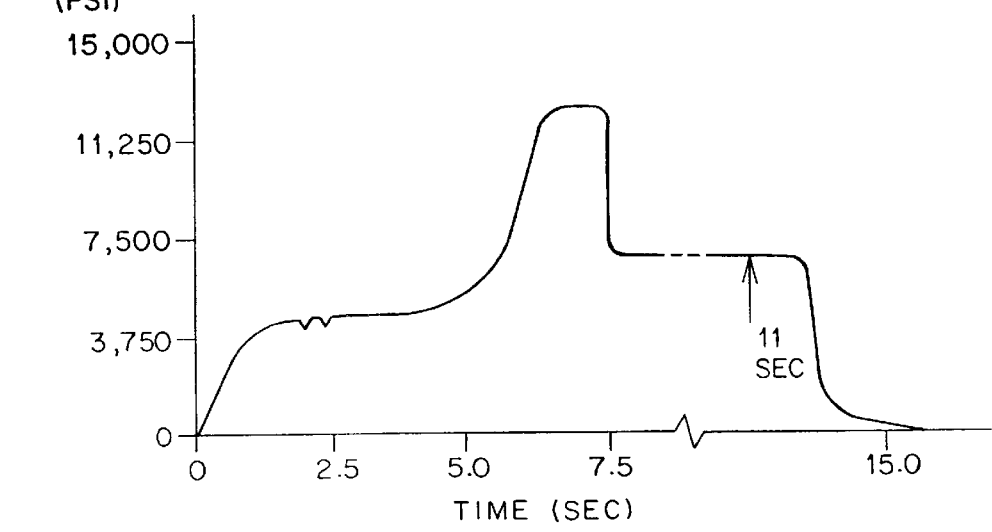

As shown in FIGS. 7A–7B, taken near the middle of the holding stage at t=11 seconds, the backflow layers (18a, 30a, 19a) have now traveled all the way down into the flange 12, but still remain within the outer first shot layer 21.

Although the above diagrams establish that a flow reversal occurs during the packing and cooling stage, a solution to the problem was not obvious and took over six years to discover.

Backflow has been found to be a particular problem with preforms having a short (reduced height) neck finish (compared to the height of the body) and/or preforms designed to make containers having a long and thin neck. Preforms for long and thin neck containers tend to have a wall thickness in the neck-forming region which is relatively thin, because this neck-forming region must undergo relatively large amounts of axial stretch to compensate for the relatively low amount of radial stretch. It was not clear why these particular preform designs were having a problem with backflow. Still further, the backflow problem was found to aggravate erosion of the top sealing surface by the internal barrier layer, such that an effective seal could not be provided with 100% assurance.

It has been found that in a preform for making a container having a relatively tall and slender neck portion (e.g., a ketchup container), the tapered neck region in the preform mold has a surprising affect on what may be considered, a relatively minor leading edge effect caused for example by a misalignment between the core and cavity. When multiple layers are injected in a mold to make such a preform, a relatively small leading edge effect may develop in the first flow front (caused by core misalignment), prior to reaching the tapered region. Then, as the first flow front advances through the tapered region, there is an increase in the velocity of the flow which causes an increased circumferential flow of material from the leading to the trailing edge at the first flow front. This effectively reduces the leading edge effect in the first flow front. However, it will aggravate (increase) a leading edge effect in any second or later flow front, such that once the second flow front reaches the upper end of the tapered region, there is now a significant leading edge effect. This in turn is likely to induce backflow of the second flow front leading edge during the packing and cooling stage.

Figure 9:
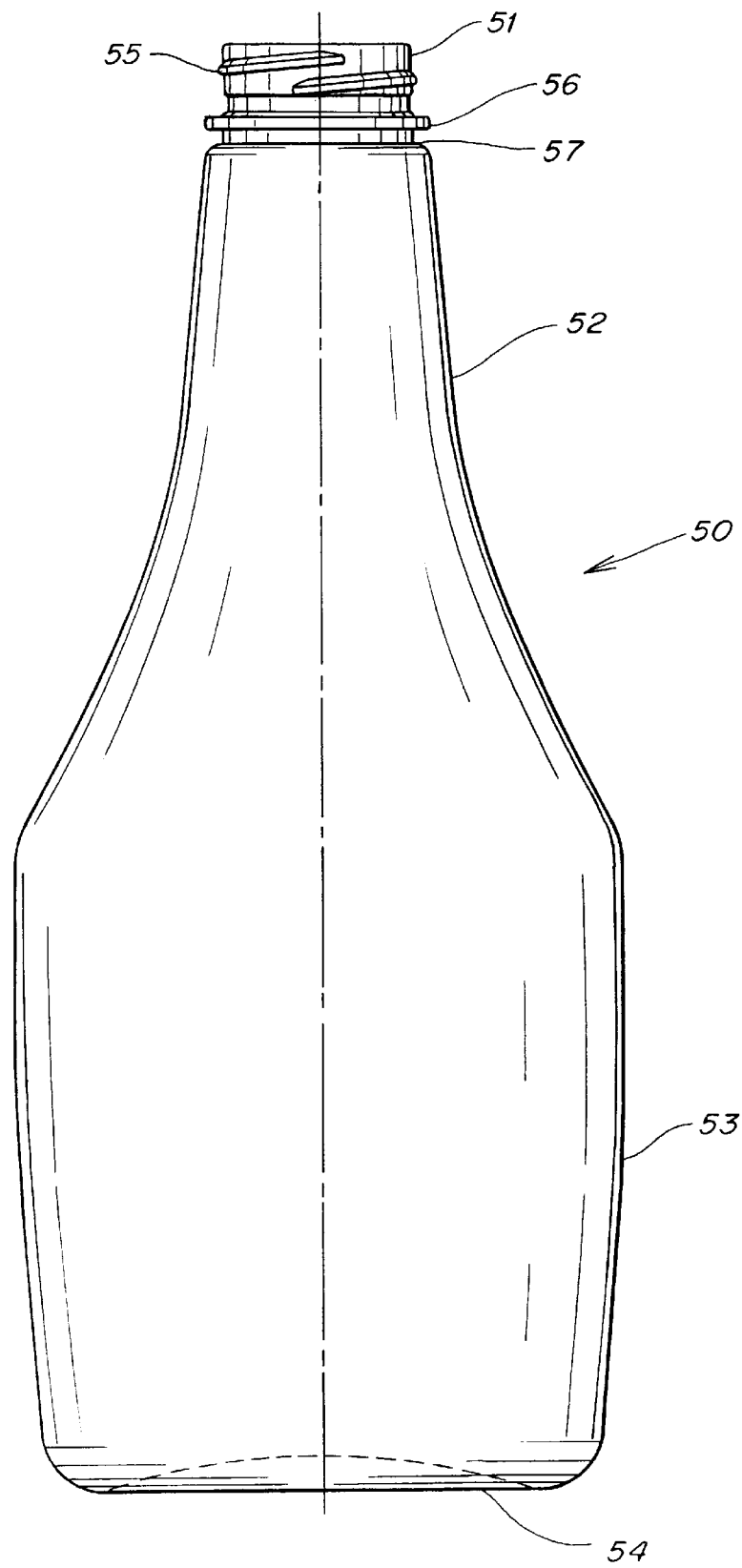
FIG. 9 is a front elevational view of a ketchup container.

FIG. 9 shows an exemplary ketchup container 50 having an upper neck finish 51, a long and thin neck 52, a sidewall 53, and a base 54. The neck finish includes threads 55 and a lowermost support ring or flange 56. There is a transition region below the flange 56, marked by reference number 57, which substantially defines the area below which radial and axial stretching of the preform begins. Because of the container's long and thin neck profile, a preform is used, such as that shown in FIGS. 10–12, having a tapered neck region 82. Because the long and thin container neck 52 undergoes relatively little radial stretch, it is necessary to enhance the axial stretch in order to achieve the necessary biaxial orientation (and resulting mechanical strength) in the neck 52. For this reason, a tapered neck region is provided in the preform which decreases in wall thickness going towards the neck finish 81 (see FIG. 12); the decrease in wall thickness is achieved by reducing the diameter of the outer wall 85 as it approaches the neck finish. The reduced thickness portion of the neck region is caused to undergo greater axial stretch during the initial axial elongation of the preform (because it is thinner than the remaining sidewall and outer base portions and thus easier to stretch). Within the neck region 82 itself, an upper portion 95 undergoes relatively greater axial stretch than a lower portion 96, because of the tapering wall thickness.

Figure 10A:
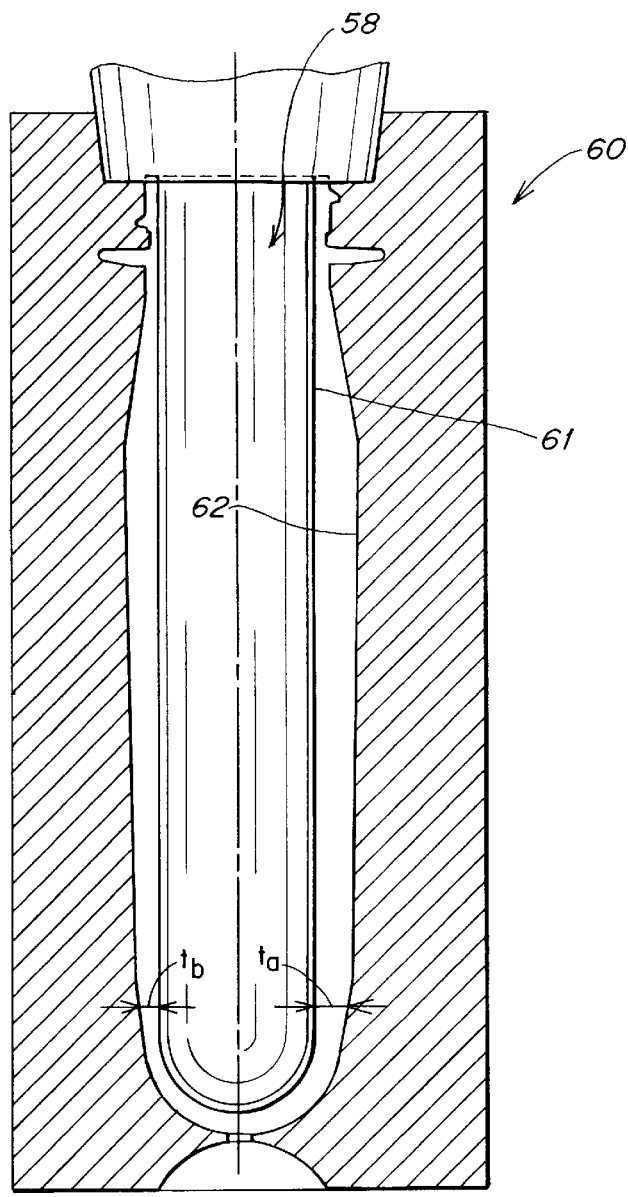
FIG. 10A is a schematic cross-section taken through an injection mold showing a slight misalignment or lack of concentricity between the core and cavity walls.
Figure 10B:
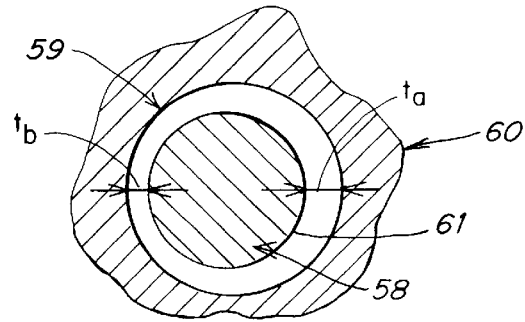
FIG. 10B is a cross-section taken through a lower portion of the mold.

FIG. 10 shows one potential cause of a leading edge effect, namely a misalignment of the core and cavity. Core shift is a common phenomenon that occurs to some degree in all injection tools—single or multicavity, mono or multilayer. FIG. 10A is a cross-section along the length of the preform mold 60. A core 58 is positioned in an outer cavity to define a space for molding a preform between the core wall 61 and cavity wall 62. A misalignment of the core and cavity is illustrated at a circumference 59 near the lower end of the preform, which is illustrated in cross-section in FIG. 10B. The core is shifted slightly to the left, so that the distance between the core wall and cavity wall on the right side ($t_a$) is greater than the distance between the core wall 61 and cavity wall 62 on the left side ($t_b$). Container manufacturers impose limits on the maximum wall variation in the preform, which is defined by: $\sqrt{a^2+b^2}$, the minimum and maximum radial wall thicknesses.

Other potential causes of a leading edge effect include nonsymmetric cooling, i.e., temperature differences at various points along the core and cavity walls, and melt non-uniformity, i.e., polymer temperature differences due to variations in the hot runner system. However core/cavity misalignment has now been identified as a primary cause of the leading edge effect in sequential co-injection.

Figure 11:
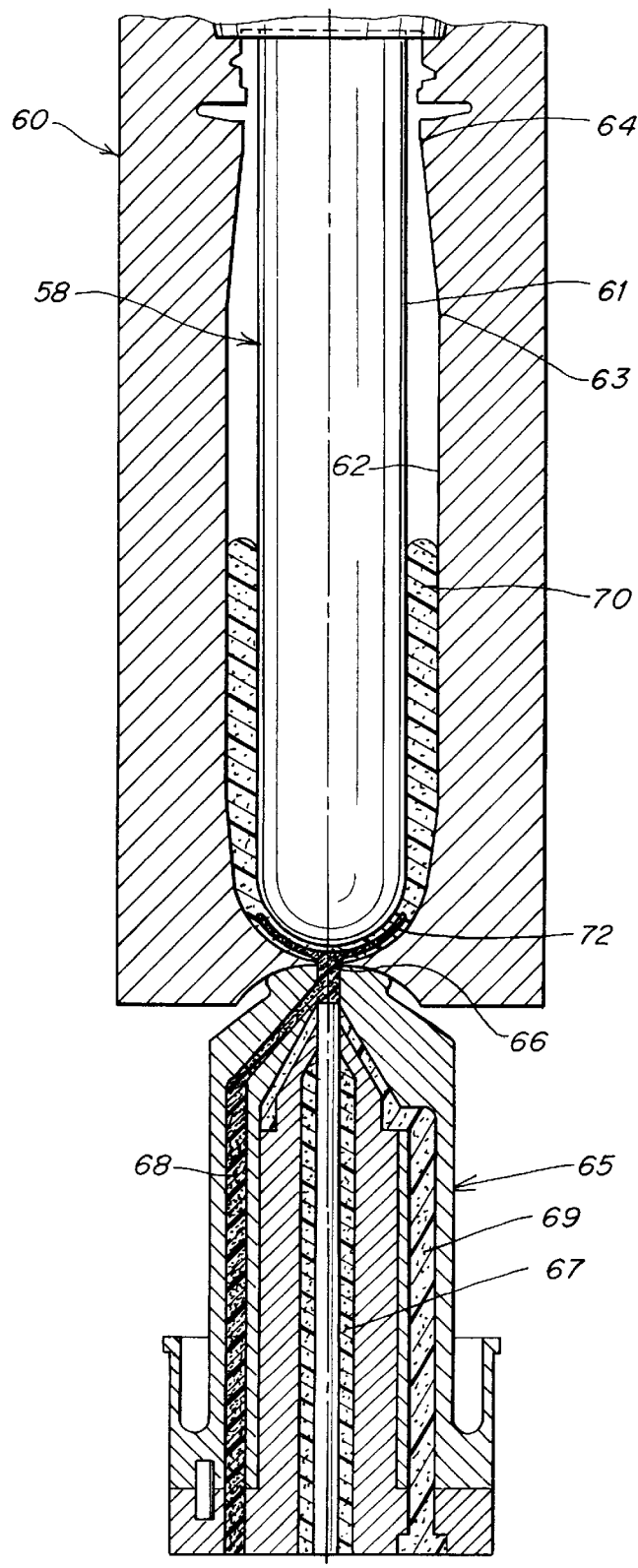
FIG. 11 is a schematic cross-section taken through an injection nozzle and preform during filling, showing first and second shots in a sequential injection process.

FIG. 11 illustrates schematically the preform mold cavity defined by core wall 61 and cavity wall 62, and an injection nozzle 65 for sequentially injecting different polymer materials into a gate 66 at the bottom of the preform mold. In CPT's sequential injection molding process, because the first shot is only a single layer, there is no great difficulty in ensuring a substantially balanced flow of the first shot up the wall in each cavity (of a multi-cavity apparatus). This is illustrated in FIG. 11, wherein first shot material 70 is injected from a central channel 67 in the nozzle, and flows about halfway up the preform wall. It has been found, even if there is some core/cavity misalignment, that any leading edge difference in the first shot is very small, i.e., about 1 mm, when it reaches the upper end of the sidewall, at the lower boundary 63 of the tapered neck region. Furthermore, when examining short shots it has been found that this small difference does not increase as the first shot proceeds up through the tapered region to the upper boundary 64.

In CPT's process, the second (barrier) shot 72 also does not require complex equipment or process controls. In sequential molding, it is possible to introduce the barrier melt through an unbalanced and non-concentric single drill channel 68, as shown in FIG. 11. Despite the offset barrier melt introduction into the cavity, the flow resistance provided by the virgin PET (first shot) already in the cavity forces the barrier material to form a circumferentially-balanced, disk-like melt pool within the frozen PET skin layers. This "self-leveling" feature of sequential injection means there is substantially no leading edge effect due to introduction of the materials into the mold cavity.

Figure 12:
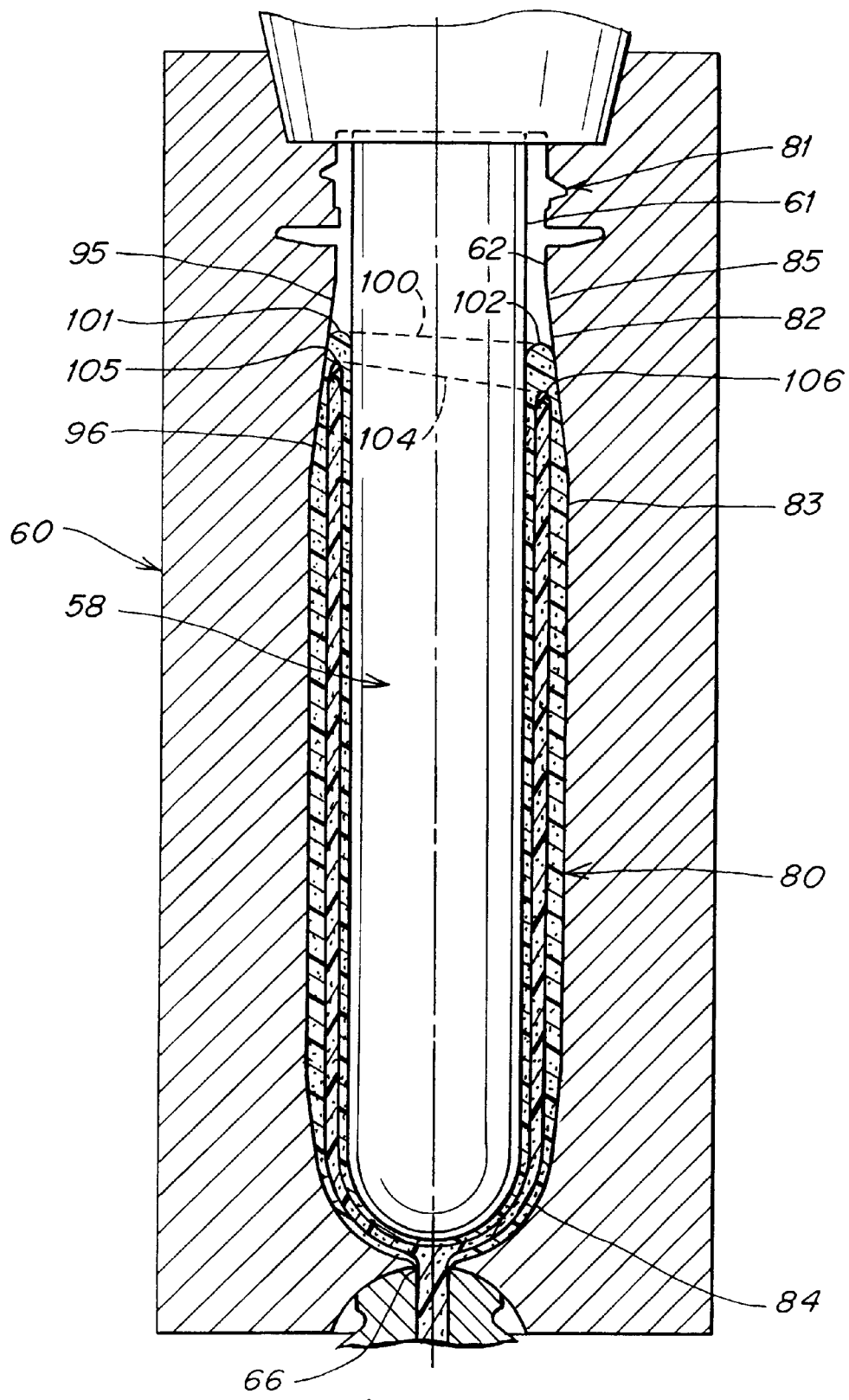
FIG. 12 is a schematic illustration of a multilayer preform during injection, showing in vertical cross-section a first melt front of a first material and a second melt front of a second material in a tapered neck region of the preform, with a developing edge effect in the second flow front.

Finally, a third shot of virgin or recycled PET can be injected via offset channel 69, and likewise forms a self-leveling melt pool, which subsequently pushes the first and second shots ahead of it to fill the mold. FIG. 12 shows the first, second and third shot layers as they are moving up through the tapered region. In FIG. 12, the preform profile 80 is defined by the core wall 61 and cavity wall 62, and includes the neck finish 81, tapered region 82, sidewall 83 and base 84. At this stage in the mold-filling cycle, the first shot material has a first flow front 100 with a difference in height of the advancing front (as measured from the bottom of the preform) between upper point 101 (on the left) and lower point 102 (on the right), at different points on the circumference. Meanwhile, a second shot material with second flow front 104 has developed an enhanced difference between upper point 105 (on the left) and lower point 106 (on the right). As shown in FIG. 12, the second front 104 is developing a larger edge effect (greater difference between leading and trailing points) around the circumference than the first front 100.

It was thought that perhaps the third shot of virgin or recycled PET was causing the unbalanced flow of the second shot material, because the third shot effectively pushes the second shot (barrier) up the sidewall of the preform. For example, it was thought that if the temperature of the third shot varied around the circumference, due to thermal imbalances imparted in the hot runner system, then the mold cavity would have a hot side and the second and third shots would move faster up the hot side. Many efforts were made over an extended period of time to try to understand why the leading edge effect was developing in the second shot and how it might be eliminated. For example, changes were made in the hot runner system including moving heater bands, adding melt mixers, changing how the barrier flows around the nozzle, modifying the materials used in the manifolds, and removing valve stems. However, none of the above were found to effectively influence or correct the problem.

Figure 13:
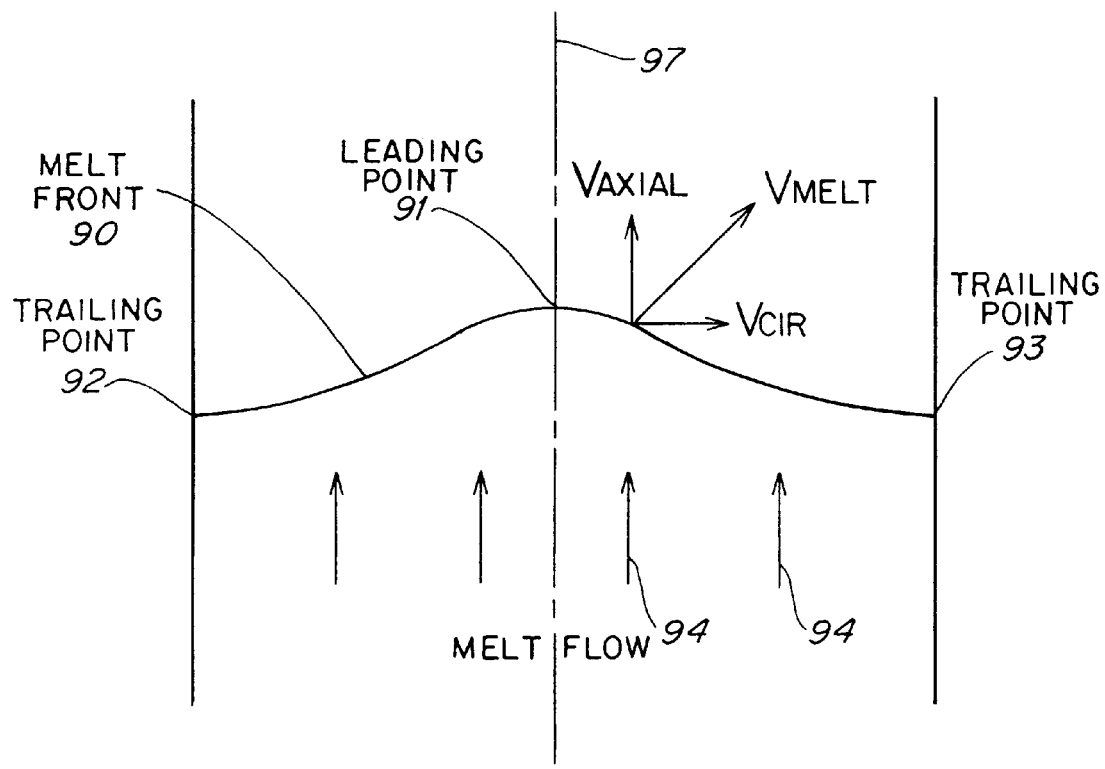
FIG. 13 is an enlarged diagram of a melt front having a leading edge effect and showing the axial and circumferential planer components of the melt front velocity.

After much experimentation, the source of the leading edge effect in the second shot is believed to have been determined, and a solution found as well. FIG. 13 is a lengthwise cross-section showing a melt front 90 across a width of a preform having a leading point 91 at the center of a vertical axis 97 and trailing points 92, 93 at each of the outer side edges of the melt front. The melt front direction is represented by a number of parallel vertical arrows 94 pointing up. Because of the leading point/trailing point difference, the velocity of the melt front is not parallel to the melt flow direction, but rather at an angle thereto. As shown, the velocity of the melt ($V_{melt}$) has both an axial component ($V_{axial}$) and a circumferential component ($V_{cir}$). The circumferential component causes material to flow circumferentially in the cavity, transverse to the filling direction.

As previously described, the first shot of virgin PET may develop a leading edge effect as it moves up the injection cavity due to nonsymmetric conditions that may exist in the system, such as the lack of concentricity between the core and cavity walls, nonsymmetric temperature conditions, etc. The circumferential component of the melt velocity causes the virgin PET in the vicinity of the leading point to flow toward the trailing point. Such a circumferential flow would increase the size of the melt pool in front (ahead) of the second and third melt fronts in line (circumferentially) with the first front trailing point, and at the same time, decrease it ahead of the second and third melt fronts in line (circumferentially) with the first front leading point. The circumferential flow of the first material would thus reduce the difference between the leading and trailing points in the first flow front, and thus reduce the edge effect in the first flow front. However, it has the opposite effect on the second and subsequent flow fronts. Because of the transfer of material circumferentially, there would be an unbalanced circumferential flow ahead of the second (and subsequent) flow front which may cause or enhance a leading edge effect in the second (and subsequent) flow front.

Surprisingly, it has been found that the width of the tapered region has a substantial effect on the development of a leading edge effect in the second flow front. It has been found that increasing the minimum width in this tapered neck region, within the limits allowed by the desired preform/container axial stretch ratios, has a substantial affect on reducing development of a leading edge effect in the second or subsequent flow fronts.

For example, it has been found that in a case where a second shot flow front had a leading/trailing edge differential of about 1 mm at the beginning (lower border 63) of the tapered region, by the time the second shot reached the upper border 64 of the tapered region, the edge differential (of the second flow front) had increased to 5–10 mm, and even as high as 20 mm, depending on the amount of the wall thickness reduction experienced through the critical tapered neck region.

Adjusting the minimum wall thickness of the tapered neck region can substantially reduce or eliminate the problem. However, for certain preform designs, it may not be possible to completely eliminate backflow because the thickness of the tapered neck region would be too great to provide the necessary axial stretch in a corresponding portion of the blow-molded container. In this case, backflow can be reduced by increasing the tapered neck region wall thickness to the extent possible.

It has also been discovered that backflow often produces a concurrent problem with defective welded seals, in that erosion of the top sealing surface by the barrier material accompanies backflow of the barrier material in the neck finish. This problem is illustrated in FIGS. 14–17.

In general, close proximity of the barrier material to the top sealing surface (TSS) is undesirable for those container applications where a heat-bonded seal is employed. Excessive induction heating time and/or temperature may melt the exterior PET layer at the TSS, thus exposing the barrier material to the foil adhesive which may in turn weaken or destroy the seal integrity. As such, it is desirable to maintain the EVOH flow front at a distance of at least about 0.1 mm below the TSS.

Figure 14A:
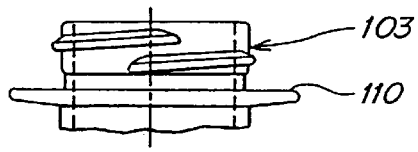
FIGS. 14A and 14B are schematic side plan and top plan views respectively of a neck finish and flange (support ring)
Figure 14B:
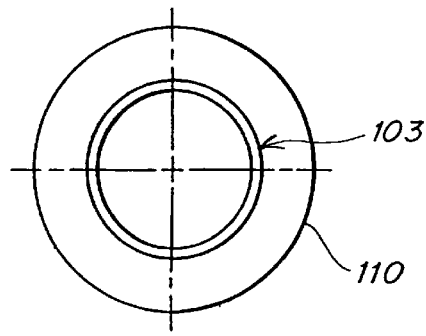
Figure 14C:
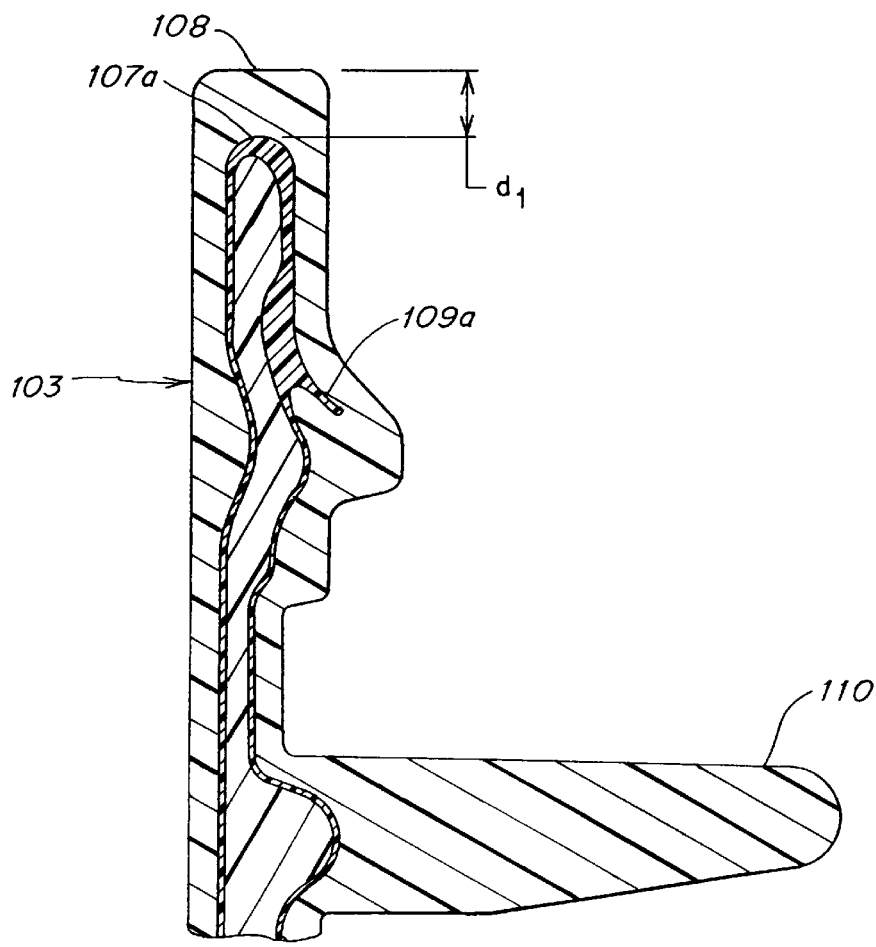
FIG. 14C is a vertical sectional view through the neck finish of FIG. 14A showing the amount of EVOH backflow and distance between the EVOH and top sealing surface of the finish.

FIGS. 14A–14C show schematically in side, plan and cross-sectional views, a neck finish 103 in which is minimal amount of backflow has occurred (see backflow 109a), and there is a substantial distance $d_1$ between the top 107a of the internal EVOH barrier layer and the TSS 108. Here $d_1=1.0$ mm and there has been no backflow into the flange 110.

Figure 15A:
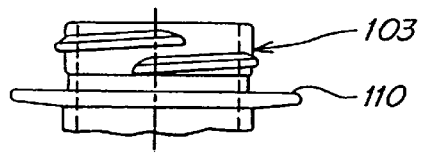
Figure 15B:
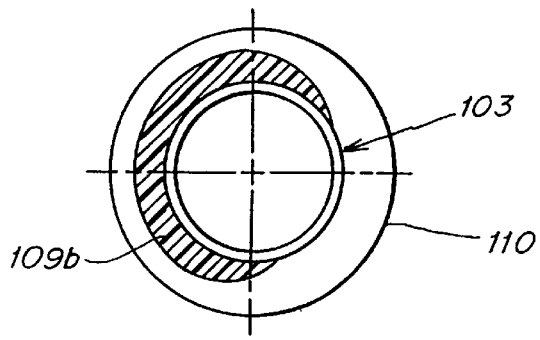
Figure 15C:
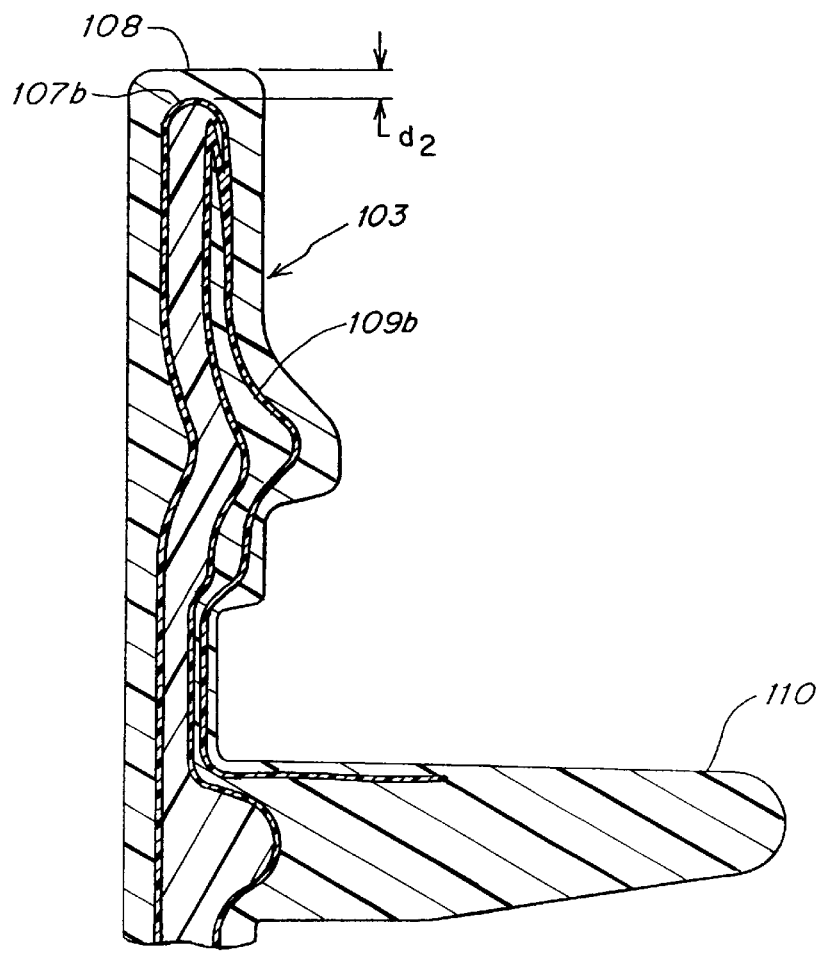
Figure 16A:
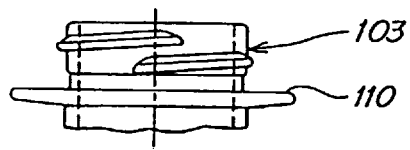
Figure 16B:
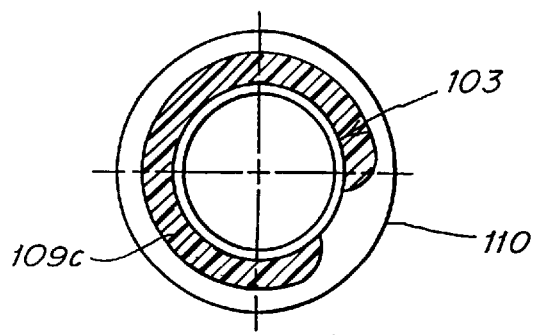
Figure 16C:
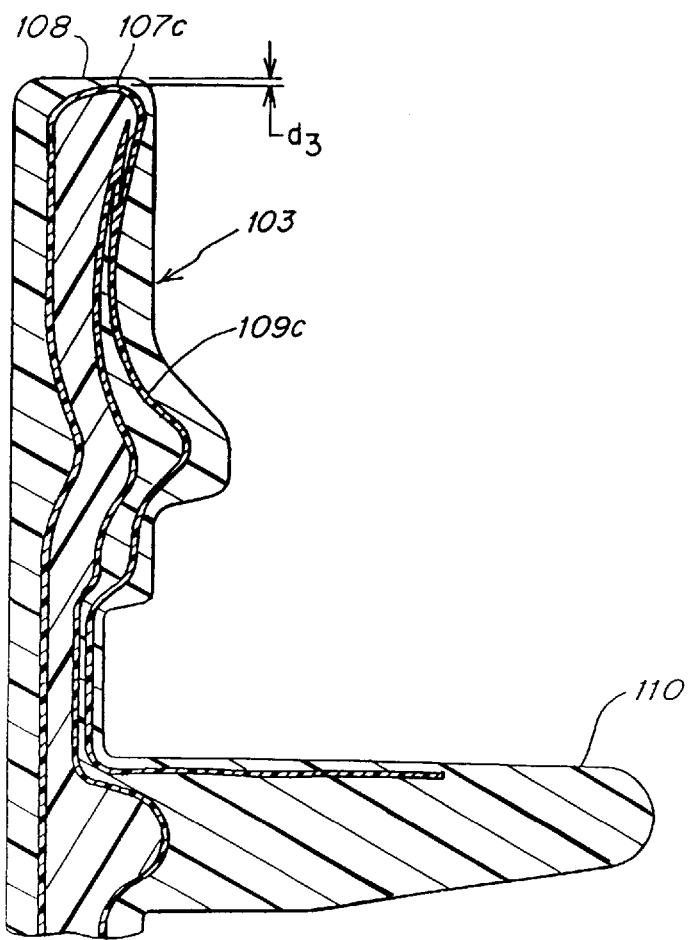
Figure 17A:
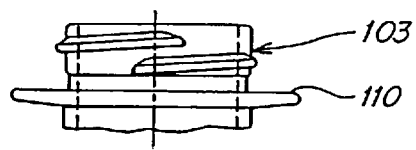
Figure 17B:
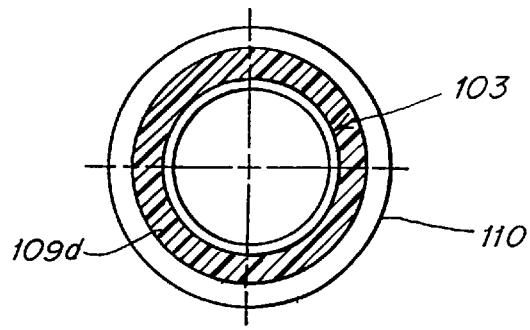
Figure 17C:
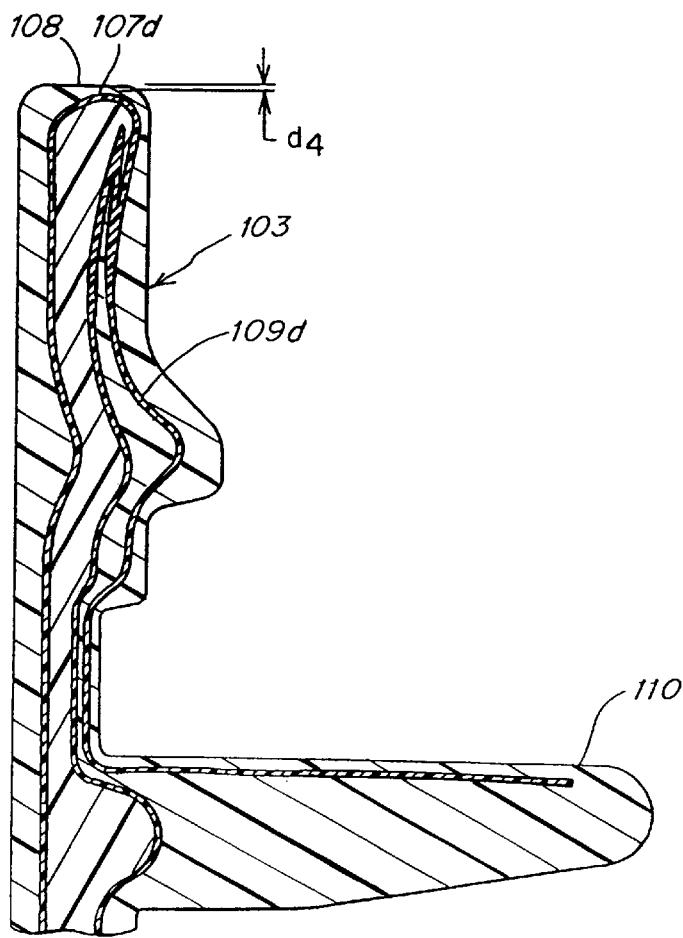

FIGS. 15A–17A, 15B–17B and 15C–17C are similar to FIGS. 14A, 14B and 14C respectively, but with increasing amounts of barrier layer backflow (109b–109d) which not only structurally weaken the neck finish, but cause the top (107b–107d) of the EVOH barrier layer to approach the TSS. In FIG. 15, the EVOH has backflowed (109b) into the flange, at greater than 180° but less than 270° around the flange, and the distance $d_2$ from the top sealing surface is reduced to about 0.4 mm. This still enables formation of an effective heat seal. In FIG. 16, the EVOH has backflowed (109c) further into the flange and now extends about 320° around the flange, and the distance $d_3$ has approached to within 0.1 mm of the top sealing surface. This distance is the minimum for an acceptable seal. Finally, in FIG. 17 the EVOH barrier has backflowed (109d) such that it extends completely around the full 360° flange, and the distance $d_4$ is less than 0.1 mm; this is too close to the TSS and will lead to inevitable seal failures.

Figure 18:
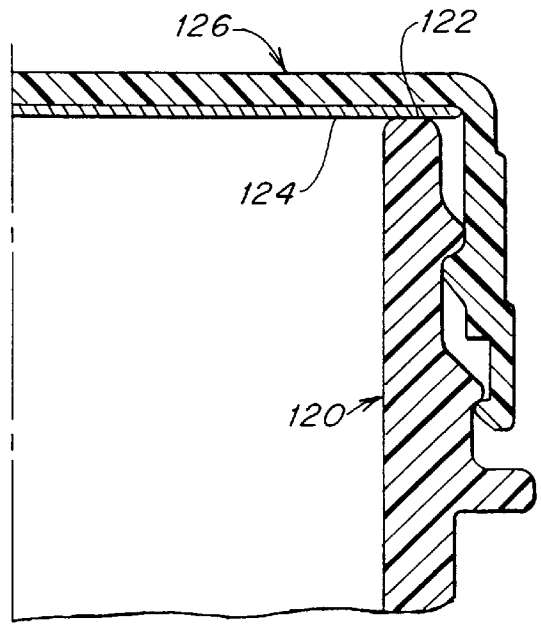
FIG. 18 is an enlarged fragmentary cross-section of a neck finish with a foil seal bonded to the top sealing surface, and a cap.

FIG. 18 is an enlarged cross-section of a neck finish with a heat-bonded seal and cap, according to one embodiment. More specifically, a neck finish 120 has a TSS 122, with a heat-bonded laminated foil liner or seal 124. The liner 124 lies within an inner surface of a cap 126. The liner 124 is intended to ensure a tight seal to prevent leakage, in the event there is any deformation in the neck finish.

Figure 19:
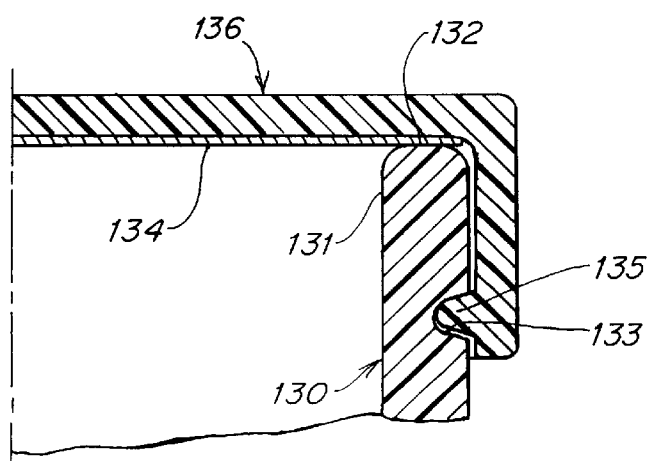
FIG. 19 is an enlarged fragmentary cross-section of an alternative neck finish, seal and cap.

FIG. 19 shows an alternative low-height neck finish 130. In order to minimize the weight of the finish, not only is the height of the finish reduced but there are no threads on the upper neck finish portion 131, and there is no lowermost flange. Instead of the flange, a radially indented groove 133 is provided, which is engaged by a projection 135 on a snap-fit cap 136. Again, a foil liner 134 is heat bonded to a top sealing surface 132 of the neck finish.

The present invention has many potential applications for preventing significant leading edge effects which cause backflow or sealing defects in a multilayer article, including preforms and stretch blow-molded containers. For example, it is common to use recycled PET as one or more layers in order to decrease the overall cost of the container. However, because recycled PET has a larger color component than virgin PET, it has been found that the recycled PET heats more quickly (i.e., during the reheat process, prior to blow molding). If there is a circumferential difference in the final flow front of the recycled PET layer, the circumferential imbalance may lead to a circumferential imbalance in the heating of the layer and a resulting imbalance in the amount of stretching during blow molding.

Another problem which may result from an uneven circumferential distribution of a polymer layer in a preform or container is a visual "lensing" effect which renders the preform/container unacceptable. For example, a difference in a barrier (e.g., EVOH) flow front may produce an oriented bottle wall with a visual distortion or defect in the oriented neck region. These and other problems may be reduced and/avoided by use of the methods of the present invention.

Although particular embodiments of the present invention have been described, various modifications will be readily apparent to a person skilled in the art and are included herein.

In various alternative embodiments, one or more layers of the preform and container, or portions thereof, can be made of various polyesters and various other polymers, such as polyolefins (e.g., polypropylene and polyethylene), polyvinyl chloride, polyacrylate, etc. Suitable polyesters include homopolymers, copolymers or blends of polyethylene terephthalate (PET), polybutylene terephthalate (PBT), polypropylene terephthalate (PPT), polyethylene naphthalate (PEN), and a cyclohexane dimethanol/PET copolymer, known as PETG (available from Eastman Chemical Company, Kingsport, Tenn.). Polyesters based on terephthalic or isophthalic acid are commercially available and convenient. The hydroxy compounds are typically ethylene glycol and 1,4-di-(hydroxy methyl)-cyclohexane. In general, the phthalate polyester may include polymer linkages, side chains, and end groups not related to the formal precursors of a simple phthalate polyester previously specified. Conveniently, at least 90 mole percent will be terephthalic acid and at least 90 mole percent an aliphatic glycol or glycols, especially ethylene glycol.

Recycled or post-consumer PET (PC-PET) is prepared from PET plastic containers and other recyclables that are returned by consumers for a recycling operation, and has now been approved by the FDA for use in certain food containers. PC-PET is known to have a certain level of I.V. (intrinsic viscosity), moisture content, and contaminants. For example, typical PC-PET (having a flake size of one-half inch maximum), has an I.V. average of about 0.66 dl/g, a moisture content of less than 0.25%, and the following levels of contaminants:

PVC: <100 ppm aluminum: <50 ppm olefin polymers (HDPE, LDPE, PP):<500 ppm paper and labels: <250 ppm colored PET: <2000 ppm other contaminants: <500 ppm PC-PET may be used alone or in one or more layers for reducing the cost or for other benefits.

Also useful as a high-oxygen barrier layer is a bottle-grade polyester packaging material with physical properties similar to PET, namely polyethylene naphthalate (PEN). PEN provides a 3–5× improvement in barrier property and enhanced thermal resistance, at some additional expense. Polyethylene naphthalate (PEN) is a polyester produced when dimethyl 2,6-naphthalene dicarboxylate (NDC) is reacted with ethylene glycol. The PEN polymer comprises repeating units of ethylene 2,6 naphthalate. PEN resin is available having an inherent viscosity of 0.67 dl/g and a molecular weight of about 20,000 from Amoco Chemical Company, Chicago, Ill. PEN has a glass transition temperature $T_g$ of about 123° C., and a melting temperature $T_m$ of about 267° C. PET and PEN may be blended or copolymerized in various amounts. In the ranges of about 0–20% PEN and 80–100% PEN, the material may be crystallized, while from about 20–80% PEN the material can not be crystallized and remains substantially amorphous.

In The structures of PET and PEN are shown below:

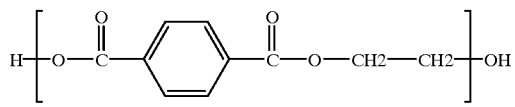

PET

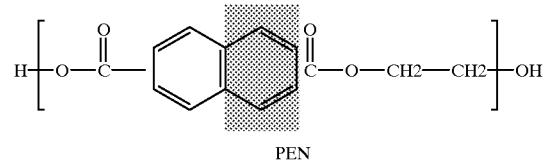

PEN

Suitable polyamides (PA) include PA6, PA6,6, PA6,4, PA6, 10, PA11, PA12, etc. Other options include acrylic/amide, amorphous nylon, polyacrylonitrile (PAN), polystyrene, crystallizable nylon (MXD-6), polyethylene (PE), polypropylene (PP), and polyvinyl chloride (PVC).

The multilayer preform/container may also include one or more layers of an oxygen barrier material such as ethylene/vinyl alcohol (EVOH), PEN, polyvinyl alcohol (PVOH), polyvinyldene chloride (PVDC), nylon 6, crystallizable nylon (MXD-6), LCP (liquid crystal polymer), amorphous nylon, polyacrylonitrile (PAN) and styrene acrylonitrile (SAN).

The intrinsic viscosity (I.V.) effects the processability of the resins. Polyethylene terephthalate having an intrinsic viscosity of about 0.8 is widely used in the carbonated soft drink (CSD) industry. Polyester resins for various applications may range from about 0.55 to about 1.04, and more particularly from about 0.65 to 0.85 dl/g. Intrinsic viscosity measurements of polyester resins are made according to the procedure of ASTM D-2857, by employing 0.0050±0.0002 g/ml of the polymer in a solvent comprising o-chlorophenol (melting point 0° C.), respectively, at 30° C. Intrinsic viscosity (I.V.) is given by the following formula:

$$I.V.=(\ln(V_{Soln.}/V_{Sol.}))/C$$

where:

$V_{Soln.}$ is the viscosity of the solution in any units;

$V_{Soln.}$ is the viscosity of the solvent in the same units; and

C is the concentration in grams of polymer per 100 mls of solution.

The blown container body in one embodiment is substantially transparent. One measure of transparency is the percent haze for transmitted light through the wall ($H_T$) which is given by the following formula:

$$H_T=[Y_d\div(Y_d+Y_s)]\times 100$$

where $Y_d$ is the diffuse light transmitted by the specimen, and $Y_s$ is the specular light transmitted by the specimen. The diffuse and specular light transmission values are measured in accordance with ASTM Method D 1003, using any standard color difference meter such as model D25D3P manufactured by Hunterlab, Inc. The container body in this embodiment should have a percent haze (through the panel wall) of less than about 10%, and more preferably less than about 5%.

The preform body-forming portion in this embodiment should also be substantially amorphous and transparent, having a percent haze across the wall of no more than about 10%, and more preferably no more than about 5%.

The container will have varying levels of crystallinity at various positions along the height of the bottle from the neck finish to the base. The percent crystallinity may be determined according to ASTM 1505 as follows:

% crystallinity=$[(ds-da)/(dc-da)] \times 100$ where ds=sample density in g/cm$^3$, da=density of an amorphous film of zero percent crystallinity, and dc=density of the crystal calculated from unit cell parameters. For the PET/EVOH 5L ketchup container previously described, the panel or sidewall portion 53 of the container is stretched the greatest and preferably has an average percent crystallinity of at least about 10%, and more preferably at least about 15%. The percent crystallinity in the neck region 52 is preferably 5–10%.

Further increases in crystallinity can be achieved by heat setting to provide a combination of strain-induced and thermal-induced crystallization. Thermal-induced crystallinity is achieved at low temperatures to preserve transparency, e.g., holding the container in contact with a low temperature blow mold. In some applications, a high level of crystallinity at the surface of the sidewall alone is sufficient.

As a further alternative, the preform may include one or more layers of an oxygen-scavenging material. Suitable oxygen-scavenging materials are described in U.S. Ser. No. 08/355,703 filed Dec. 14, 1994 by Collette et al., entitled "Oxygen Scavenging Composition For Multilayer Preform And Container," which is hereby incorporated by reference in its entirety. As disclosed therein, the oxygen scavenger may be a metal-catalyzed oxidizable organic polymer, such as a polyamide. The oxygen scavenger may be mixed with PC-PET to accelerate activation of the scavenger. The oxygen scavenger may be advantageously combined with other thermoplastic polymers to provide the desired injection molding and stretch blow molding characteristics for making substantially amorphous injection molded preforms and substantially transparent biaxially-oriented polyester containers. The oxygen scavenger may be provided as an interior layer to retard migration of the oxygen scavenger or its byproducts, and to prevent premature activation of the scavenger.

Although certain preferred embodiments of the invention have been specifically illustrated and described herein, it is to be understood that variations may be made without departing from the invention as defined by the appended claims.

What is claimed is:

1. A method of reducing uncontrolled flow of a molten polymer during the packing and cooling stage of an injection molding cycle, wherein a plurality of polymers are injected between a mold cavity and core for making a multilayer plastic article having upper and lower regions and a tapered region there between which decreases in wall thickness as it approaches the upper region, wherein during the molding cycle at least one first polymer is injected to form an exterior layer and at least one second polymer is injected to form an interior layer, and wherein the second polymer forms a flow front having a leading/trailing edge, the method comprising the step of:

selecting the width of the tapered region, as defined between the mold cavity and core, such that the interior layer extends substantially up to the upper region at all points around the circumference and the second polymer does not reverse flow during the packing and cooling stage.

2. The method of claim 1, wherein the article is a preform adapted for stretch blow-molding a container and the tapered region is a tapered neck region adapted for making a relatively long and thin neck of the container.

3. The method of claim 2, wherein the tapered neck region is adapted to be radially stretched on the order of 1 to 2 times, and axially stretched on the order of 2 to 3 times.

4. The method of claim 1, wherein the minimum thickness of the tapered neck region is at least on the order of 2 millimeters or greater.

5. The method of claim 1, wherein the tapered and lower regions comprise a body having a body weight, the upper region is a neck finish having a finish weight, and wherein a minimum ratio of the finish weight to body weight is 1:6.

6. The method of claim 1, wherein the tapered and lower regions comprise a body having a body height, the upper region is a neck finish having a finish height, and wherein a maximum ratio of the finish height to body height is 0.2:1.

7. A method of reducing uncontrolled flow of a molten polymer during the packing and cooling stage of an injection molding cycle, wherein a plurality of polymers are injected between a mold cavity and core for making a multilayer plastic preform having a neck finish, a tapered neck region which decreases in wall thickness as it approaches the neck finish, a sidewall and a base, wherein during the molding cycle at least one first polymer is injected to form an exterior layer and at least one second polymer is injected to form an interior layer, and wherein the second polymer forms a flow front having a leading/ trailing edge, the method comprising the step of:

selecting the width of the tapered neck region, as defined between the mold cavity and core, such that the interior layer extends substantially up to the neck finish at all points around the circumference without exceeding a minimum distance from an upper surface of the neck finish.

8. The method of claim 7, wherein the minimum distance enables effective application of a heat-bonded seal to the upper surface of the neck finish.

9. In a method of molding a multilayer article in an injection mold wherein a first flow front of a first material precedes a second flow front of a second material and the first flow front has a leading/trailing edge, the improvement comprising:

retarding development of a leading/trailing edge in the second flow front by reducing a circumferential flow of the first material from the leading to the trailing edge of the first flow front.

10. The method of claim 9, wherein the circumferential flow in the first flow front is reduced by adjusting the shape of the mold.

11. The method of claim 9, wherein the circumferential flow in the first flow front is reduced by increasing the minimum width of any tapered region in the mold.

12. In a method of molding a multilayer article in an injection mold wherein a first flow front of a first material precedes a second flow front of a second material, the improvement comprising:

increasing the minimum width of any tapered region in the mold to retard development of a leading/trailing edge in the second flow front.

13. In a method of molding a multilayer article in an injection mold, the article having an internal layer and a top sealing surface, the improvement comprising:

maintaining the internal layer at a minimum distance from the top sealing surface by reducing the amount of backflow of the internal layer during a packing and cooling stage of the injection molding cycle.

14. The method of claim 13, wherein the article has a circumferential flange below the top sealing surface and backflow of the internal layer does not extend fully around the circumferential flange.

* * * * *